United States Patent [19]

Kuno et al.

[11] 4,451,888

[45] May 29, 1984

[54] SPEED CONTROL METHOD AND APPARATUS FOR AUTOMOTIVE VEHICLES

[75] Inventors: Akira Kuno, Oobu; Takeshi Matsui; Yoshio Shinoda, both of Aichi, all of Japan

[73] Assignee: Nippon Soken, Inc., Nishio, Japan

[21] Appl. No.: 232,221

[22] Filed: Feb. 6, 1981

[30] Foreign Application Priority Data

Feb. 18, 1980 [JP] Japan .................................. 55-19628

[51] Int. Cl.³ .......................... B60K 31/00; F02D 5/00
[52] U.S. Cl. .................................... 364/426; 123/352; 180/176; 180/179; 364/431.07
[58] Field of Search ................... 364/424, 426, 431.05, 364/431.06, 431.07; 123/352; 180/176, 179

[56] References Cited

U.S. PATENT DOCUMENTS

| | | | |
|---|---|---|---|
| 3,983,954 | 10/1976 | Noddings et al. | 180/179 |
| 4,215,760 | 8/1980 | Sakakibara | 180/176 |
| 4,250,854 | 2/1981 | Matsui et al. | 123/352 |
| 4,325,336 | 4/1982 | Kuno et al. | 180/179 X |
| 4,328,776 | 5/1982 | Kuno et al. | 123/352 |

*Primary Examiner*—Felix D. Gruber
*Attorney, Agent, or Firm*—Cushman, Darby & Cushman

[57] ABSTRACT

A vehicle speed control method comprises the steps of calculating a time difference between a predetermined period of time corresponding with a desired speed and the actual period of time corresponding with the actual vehicle speed, calculating a time difference between the respective actual periods of time, detecting each value of the calculated time differences in its low resolution related to a predetermined low speed range when the actual period of time represents a value in the predetermined low speed range, detecting each value of the calculated time differences in its high resolution related to a predetermined high speed range when the actual period of time represents a value in the predetermined high speed range, and producing a correction signal related to one of the detected values such that an output signal is produced to actuate a control element so as to control the quantity of fuel supplied into a combustion engine.

5 Claims, 12 Drawing Figures

SPEED CONTROL METHOD AND APPARATUS FOR AUTOMOTIVE VEHICLES

BACKGROUND OF THE INVENTION

The present invention relates to a speed control method and apparatus for automotive vehicles, and more particularly to an improvement of a speed control method and apparatus for an automotive vehicle of the type in which the quantity of fuel supply into the engine is controlled in accordance with the actual speed of the vehicle and the rate of change of the actual speed in relation to a desired command speed.

In such a speed control apparatus as described in copending U.S. patent application Ser. No. 101,855 filed on Dec. 10, 1979 in the name of Takeshi Matsui et al., now U.S. Pat. No. 4,250,854 issued Feb. 17, 1981, a speed-difference calculation circuit is provided to calculate a first time difference between a predetermined period of time corresponding with a desired vehicle speed and the actual period of time corresponding with the actual vehicle speed, and an acceleration calculation circuit is also provided to calculate a second time difference between the preceding and following actual periods of time corresponding with the actual vehicle acceleration. Thus, a correction signal is obtained based on each value of the first and second calculated time differences to control the quantity of fuel supply into the engine so as to maintain the desired command speed of the vehicle.

In the speed control described above, the actual period of time corresponding with the actual speed of the vehicle changes inversely proportional to the actual vehicle speed. This means that if each value of the first and second time differences at a high speed is detected in the same resolution or resolving power as that at a low speed, the correction signal will be erroneously obtained because the actual period of time at the high speed is shorter than that at the low speed. This results in erroneous control of fuel supply into the engine at the high speed of the vehicle.

SUMMARY OF THE INVENTION

It is, therefore, a primary object of the present invention to provide a speed control method and apparatus for an automotive vehicle in which each value of the first and second time differences is detected in its resolution or resolving power related to the actual vehicle speed to solve the problems discussed above.

According to the present invention, the above object is accomplished by provision of a speed control method for an automotive vehicle which comprises the steps of:

producing a timing signal with a period of time responsive to the actual speed of the vehicle;

producing a command signal indicative of a predetermined period of time defined by a desired speed of the vehicle;

calculating, in response to the timing signal, a first time difference between the predetermined period of time and the actual period of time of the timing signal; and calculating, in response to the timing signal, a second time difference between the respective actual periods of time of the preceding and following timing signals.

The speed control method further comprises the steps of:

detecting, in response to the timing signal, each value of the calculated first and second time differences in its low resolution or resolving power related to a predetermined low speed range when the actual period of time represents a value in the predetermined low speed range, and detecting, in response to the timing signal, each value of the calculated first and second time differences in its high resolution or resolving power related to a predetermined high speed range when the actual period of time represents a value in the predetermined high speed range;

producing a correction signal related to one of the detected values in response to the timing signal;

producing an output signal defined by each value of the correction signals; and actuating fuel control means in response to the output signal to control the quantity of fuel supplied into an internal combustion engine for the vehicle.

In a preferred embodiment of the present invention, there is provided a speed control apparatus for an automotive vehicle which comprises:

a timing signal generator for repetitively producing a timing signal with a period of time responsive to the actual speed of the vehicle;

a command-speed set circuit for producing a command signal indicative of a predetermined period of time defined by a desired speed of the vehicle;

a speed-difference calculation circuit responsive to the timing signal for calculating a first time difference between the predetermined period of time and the actual period of time of the timing signal and for producing a first difference binary coded signal indicative of an absolute value of the calculated first time difference and a first sign signal indicative of one of positive and negative signs of the calculated first time difference; and an acceleration calculation circuit responsive to the timing signal for calculating a second time difference between the respective actual periods of time of the preceding and following timing signals and for producing a second difference binary coded signal indicative of an absolute value of the calculated second time difference and a second sign signal indicative of one of positive and negative signs of the calculated second time difference.

The speed control apparatus further comprises:

a shift control circuit responsive to the timing signal for generating a first shift control signal when the actual period of time of the timing signal represents a value in a predetermined low speed range and for generating a second shift control signal when the actual period of time of the timing signal represents a value in a predetermined high speed range;

a speed-difference output shifter responsive to the first shift control signal for detecting the absolute value of the first difference binary coded signal in its high-order binary digits related to the predetermined low speed range and for producing a first detected signal indicative of the detected absolute value, the speed-difference output shifter being responsive to the second shift control signal for detecting the absolute value of the first difference binary coded signal in its low-order binary digits related to the predetermined high speed range and for producing a second detected signal indicative of the detected absolute value; and an acceleration output shifter responsive to the first shift control signal for detecting the absolute value of the second difference binary coded signal in its high-order binary digits related to the predetermined low speed range and for producing a third detected signal indicative of the detected absolute value, the acceleration output shifter being responsive to the second shift control signal for detecting the absolute value of the second difference binary coded signal in its low-order binary digits related to the predetermined high speed range and for producing a fourth detected signal indicative of the detected absolute value.

The speed control apparatus further comprises:

a correction signal generator responsive to the timing signal for calculating either one of the sum of values of the first and third detected signals or the sum of values of the second and fourth detected signals when respective signs of the first and second sign signals are identical to each other and for calculating either one of the difference between values of the first and third detected signals or the difference between values of the second and fourth detected signals when respective signs of the first and second sign signals are opposite to each other, the correction signal generator selectively producing first and second correction signals respectively indicative of the calculated sum and the calculated difference;

a distribution circuit responsive to the timing signal and one of the first and second correction signals for selectively producing first and second output signals respectively in relation to the positive and negative signs of the second sign signal; and an actuator for actuating a control element respectively in response to the first and second output signals to increase and decrease the quantity of fuel supplied into an internal combustion engine for the vehicle.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
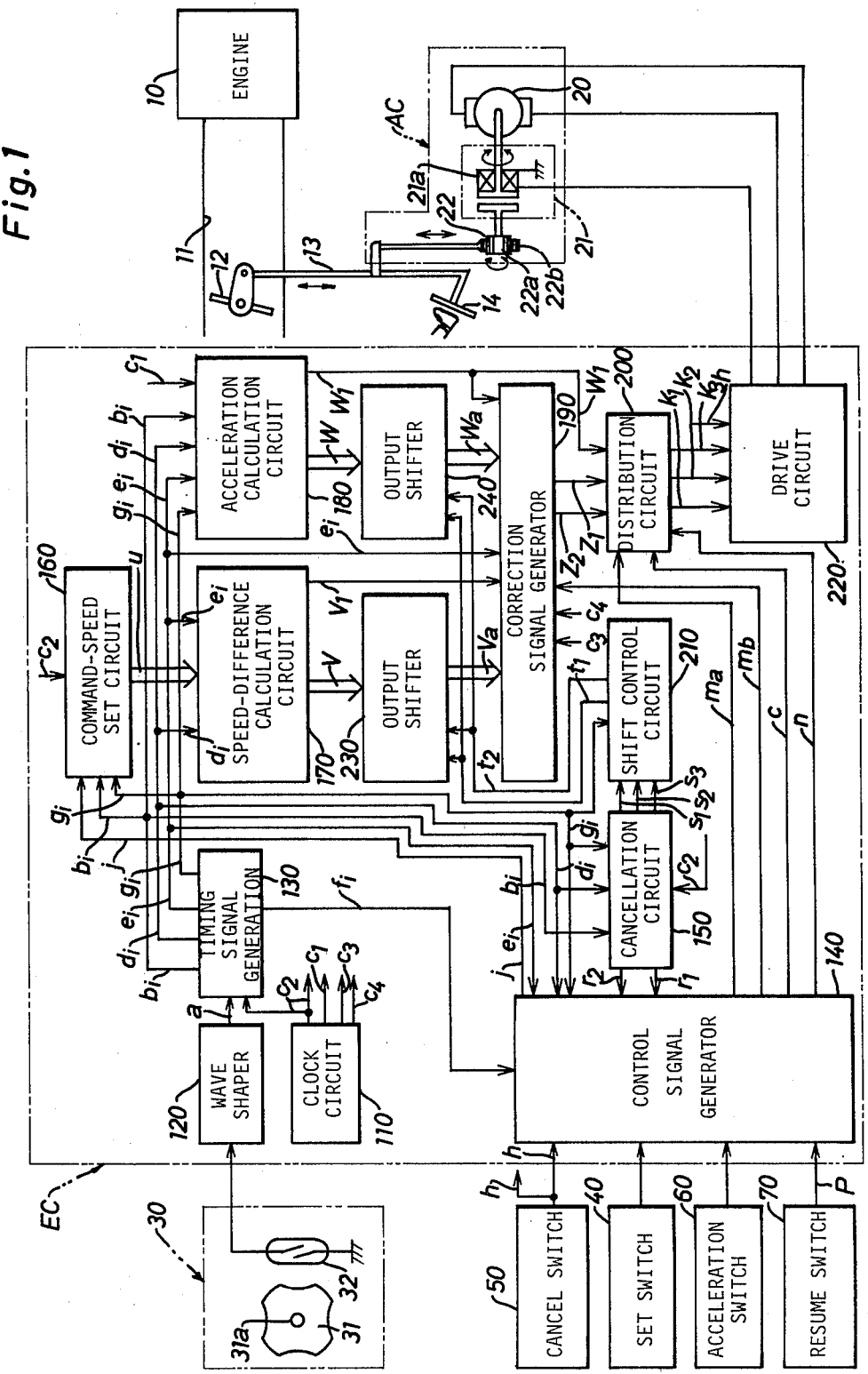
FIG. 1 is a schematic block diagram of a speed control apparatus in accordance with the present invention which is adapted to an automotive vehicle.

Referring now to the drawings, in particular to FIG. 1 there is illustrated a speed control apparatus in accordance with the present invention which is adapted to an internal combustion engine 10 of an automotive vehicle. The speed control apparatus comprises a throttle actuator AC which is operatively coupled with a throttle value 12 provided within an induction passage 11 of engine 10. The throttle actuator AC comprises an electric reversible motor 20 which is coupled with a rack-and-pinion 22 by an electromagnetic clutch mechanism 21. The clutch mechanism 21 is provided with a rotor connected to an output shaft of reversible motor 20 and with a clutch disc splined on a pinion 22a of rack-and-pinion 22. The clutch mechanism 21 is also provided with an electromagnetic coil 21a which is energized to engage the clutch disc with the rotor so as to connect the pinion 22a to the output shaft of reversible motor 20. Upon deenergization of the coil 21a, the clutch disc is disengaged from the rotor to disconnect the pinion 22a from the output shaft of reversible motor 20.

The rack-and-pinion 22 is also provided with a rack 22b which is in mesh with the pinion 22a and linked with the throttle valve 12 by way of a rod 13. When the reversible motor 20 rotates clockwise under engagement of clutch mechanism 21, the rack-and-pinion 22 moves the rod 13 downward to increase an opening angle of throttle valve 12. When the reversible motor 20 rotates counterclockwise under engagement of clutch mechanism 21, the rack-and-pinion 22 moves the rod 13 upward to decrease the opening angle of throttle valve 12. In addition, an accelerator pedal 14 for the automotive vehicle is linked with the throttle valve 12 through the rod 13 such that it is released under disengagement of clutch mechanism 21 to fully close the throttle valve 12.

Figure 4:
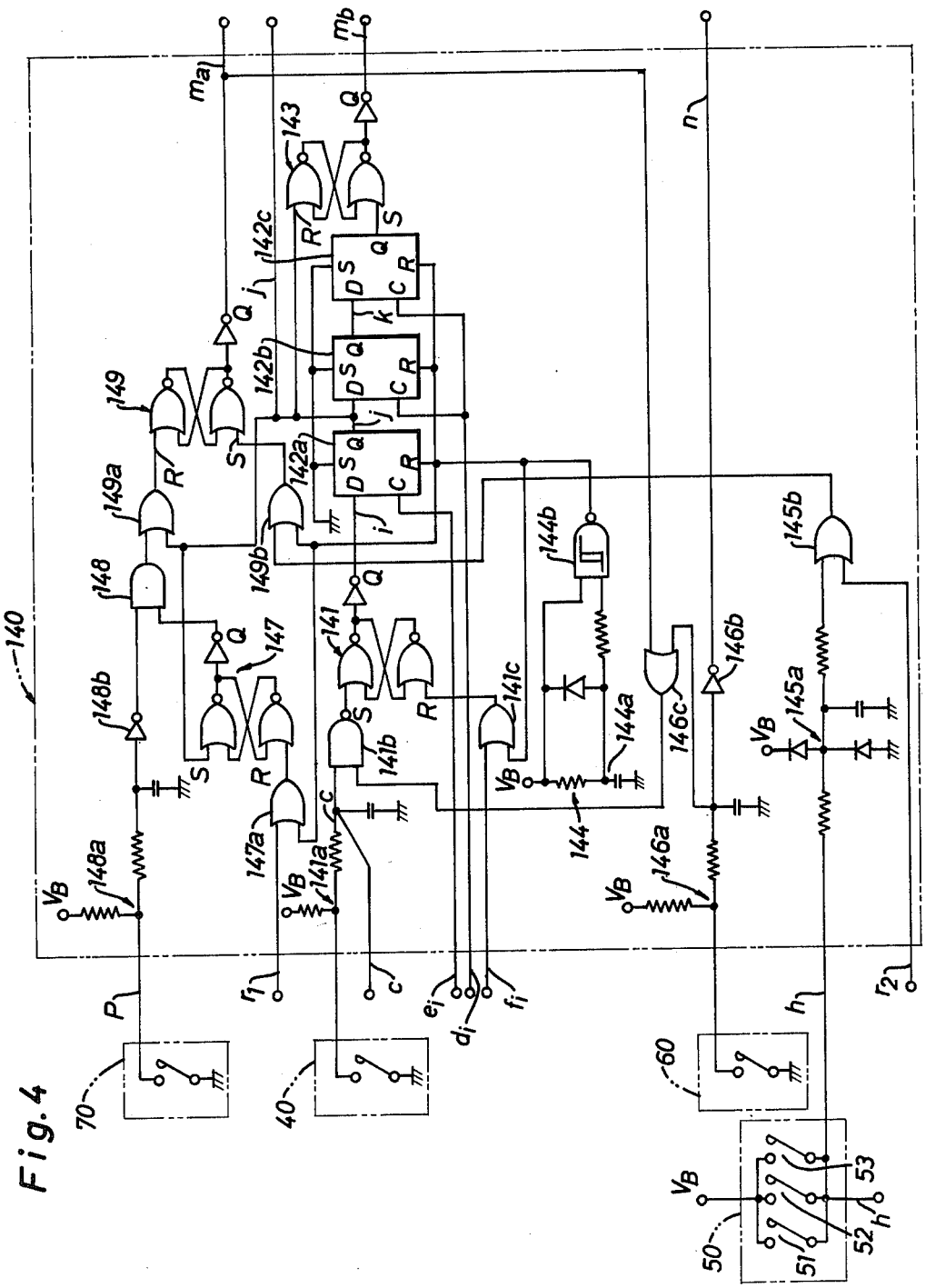
FIG. 4 is a circuit diagram of the control signal generator shown in block form of FIG. 1 in relation to the various switches.

The speed control apparatus further comprises an electronic control circuit EC which is connected to the throttle actuator AC and also to a speed sensor 30 and various switches 40, 50, 60 and 70. The speed sensor 30 includes a reed switch 32 which is located in magnetic coupling relationship with a disc 31 of permanent magnet. The disc 31 is coupled with a flexible cable 31a of a speedometer for the automotive vehicle. The reed switch 32 is repetitively opened and closed during rotation of the disc 31 to produce a series of electric signals respectively having a frequency proportional to the actual speed of the vehicle. The set switch 40 is of a normally open type, as shown in FIG. 4 and is temporarily closed at a desired or command speed of the vehicle to produce an electric signal. The electric signal from set switch 40 is used as one necessary for setting the desired speed in the control circuit EC.

As can be well seen in FIG. 4, the cancel switch 50 is provided with brake, clutch and parking switches 51, 52 and 53 which are respectively in the form of a normally open type and connected in parallel to each other. The brake switch 51 is provided on a foot brake pedal of the vehicle to be closed upon depression of the brake pedal, and the clutch switch 52 is provided on a clutch pedal of the vehicle to be closed upon actuation of the clutch pedal. The parking switch 53 is also provided on a parking mechanism of the vehicle to be closed upon manipulation of the parking mechanism. When one of the switches 51, 52 and 53 is closed, the cancel switch 50 produces a release signal h (see FIG. 5) for making the control circuit EC inoperative. The acceleration switch 60 is of a normally open type (see FIG. 4) and manually closed to produce an electric signal. The electric signal from acceleration switch 60 is used as one necessary for accelerating the vehicle under control of the control circuit EC. The resume switch 70 is also in the form of a normally open type and manually closed to produce a resume signal p (see FIG. 5). The resume signal p is used as one necessary for resuming operativeness of the control circuit EC.

The electronic control circuit EC includes a clock circuit 110, and a timing signal generator 130 connected through a wave shaper 120 to the speed sensor 30, as shown in FIG. 1. The clock circuit 110 serves to produce each series of first, second, third and fourth clock signals $C_1$, $C_2$, $C_3$ and $C_4$. Each of the electric signals from speed sensor 30 is reshaped by the wave shaper 120 into a rectangular pulse signal a in sequence (see FIG. 3). The timing signal generator 130 produces a gate signal $b_i$, latch and preset signals $d_i$ and $e_i$ and reset signals $f_i$ and $g_i$ (i=1, 2, 3, ...) in accordance with each series of the second clock and pulse signals $C_2$ and a respectively from clock circuit 110 and wave shaper 120, the gate signal $b_i$ having a period of time $T_i$ (see FIG. 3).

The control circuit EC further includes a control signal generator 140 which is connected to the switches 40 to 70, the timing signal generator 130 and a cancellation circuit 150. Upon receiving the reset signal $g_i$ from timing signal generator 130, the cancellation circuit 150 serves to produce shift command signals $s_1$, $s_2$ and $s_3$ and a release signal $r_1$ in accordance with a series of the second clock signals $C_2$ issued from clock circuit 110 within the period of time $T_i$ of gate signal $b_i$ from timing signal generator 130. As can be well seen in FIG. 6, the cancellation circuit 150 also serves to produce a release signal $r_2$ in response to the release signal $r_1$. The release signal $r_2$ is further produced from cancellation circuit 150 in response to the latch signal $d_i$ from timing signal generator 130 when the shift command signal $s_2$ is at a low level. The shift command signals $s_1$ to $s_3$ from cancellation circuit 150 are applied to a shift control circuit 210, and the release signals $r_1$, $r_2$ are applied to the control signal generator 140.

Figure 5:
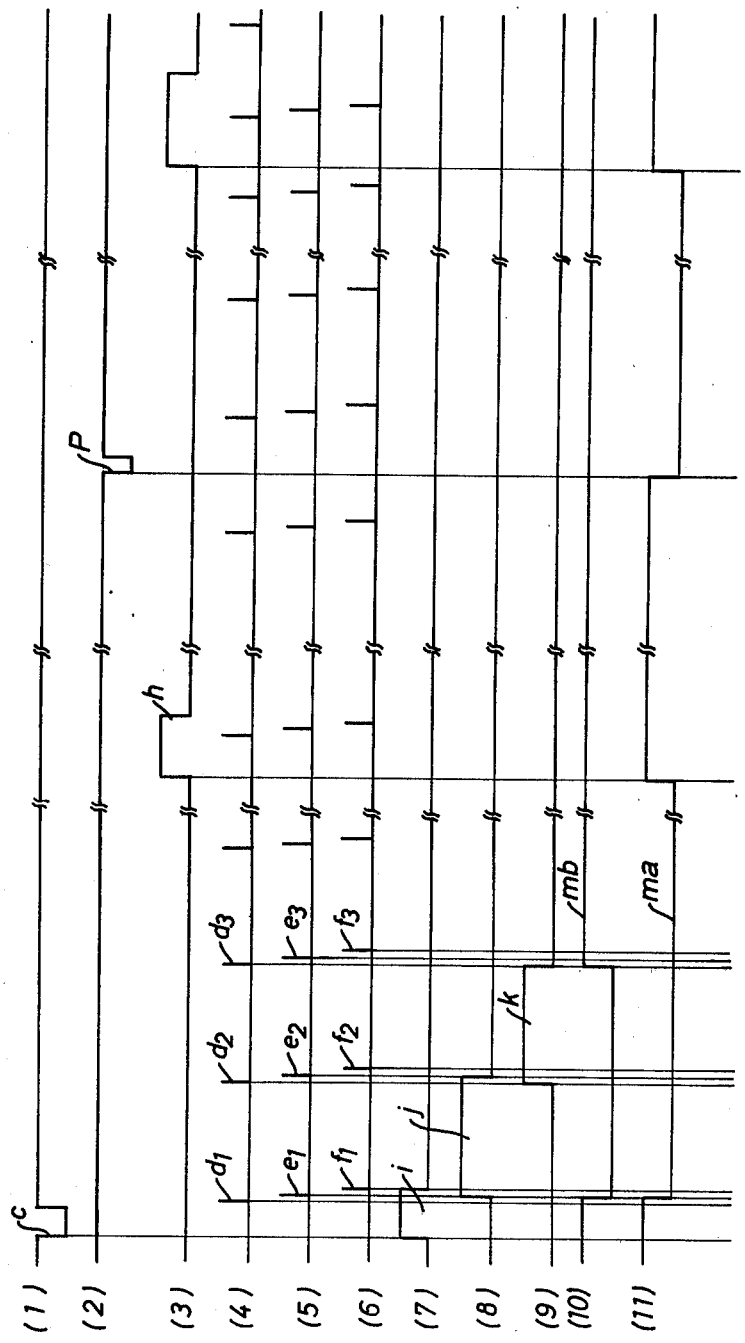
FIG. 5 illustrates waveforms obtained at various points in the control signal generator and various switches.

The control signal generator 140 receives the electric signal from set switch 40 to form a set signal c (see FIG. 5). The set signal c is applied to a distribution circuit 200. The control signal generator 140 receives the present signal $e_i$ from timing signal generator 130 after generation of the set signal c to produce a command-speed set signal j (see FIG. 5). The command-speed set signal j is applied to a command-speed set circuit 160 and disappears in response to the following preset signal $e_i$ issued from the timing signal generator 130 immediately after generation of the set signal j. As can be well seen in FIG. 4, the control signal generator 140 is responsive to one of the command-speed set signal j and the resume signal p from resume switch 70 to produce an operation signal $m_a$. The operation signal $m_a$ is applied to the distribution circuit 200 and disappears in response to one of the release signal h from cancel switch 50 and the release signal $r_2$ from cancellation circuit 150. The control signal generator 140 is responsive to the electric signal from acceleration switch 60 to produce an acceleration signal n and generates an operation signal $m_b$ in response to the latch signal $d_i$ from timing signal generator 130 immediately after disappearance of the command-speed set signal j.

The acceleration signal n is applied to the distribution circuit 200, and the operation signal $m_b$ is applied to a correction signal generator 190.

Upon receiving the reset and command-speed set signals $g_i$ and j respectively from timing and control signal generators 130 and 140, the command-speed set circuit 160 calculates the period of time $T_i$ of gate signal $b_i$, which is issued from timing signal generation 130 during generation of the command-speed set signal j, in accordance with a series of the second clock signals $C_2$ from clock circuit 110. The calculation finishes responsive to disappearance of the command-speed set signal j, and the command-speed set circuit 160 holds therein the calculated value as a binary coded signal u indicative of the period of time $T_i$ of gate signal $b_i$, related to the previous generation of the command-speed set signal j. This means that the command-speed set circuit 160 stores therein the binary coded signal u with a value corresponding to the vehicle command-speed after disappearance of the command-speed set signal j. The binary coded signal u is applied to a speed difference calculation circuit 170. Upon receiving the preset signal $e_i$ from timing signal generator 130, the speed-difference calculation circuit 170 calculates a first time difference between the value of binary coded signal u and the period of time $T_i$ of gate signal $b_i$, which is issued from the timing signal generator 130 after disappearance of the command-speed set signal j, in accordance with a series of the second clock signals $C_2$. After the calculation of the first time difference, the calculation circuit 170 is responsive to the latch signal $d_i$ following the previous preset signal $e_i$ to produce a difference or binary coded signal v indicative of an absolute value of the calculated first time difference and to produce a sign or binary signal $v_1$ indicative of a positive or negative sign of the calculated first time difference. In the embodiment, the calculated first time difference is used as a value corresponding to a speed difference between the actual and command speeds of the vehicle. The difference and sign signals v and $v_1$ are applied by the calculation circuit 170 respectively to a speed-difference output shifter 230 and the correction signal generator 190.

An acceleration calculation circuit 180 is responsive to the reset signal $g_i$ from timing signal generator 130 to calculate the period of time $T_i$ of gate signal $b_i$ in accordance with a series of the first clock signals $C_1$ from clock circuit 110 and is responsive to the preset signal $e_i$ following the previous reset signal $g_i$ to calculate a second time difference between the calculated period of time $T_i$ and the period of time $T_{i+1}$ of a gate signal $b_{i+1}$ following the previous gate signal $b_i$ in accordance with a series of the first clock signal $C_1$. After the calculation of the second time difference, the calculation circuit 180 is responsive to the latch signal $d_i$ following the previous preset signal $e_i$ to produce a difference or binary coded signal w indicative of an absolute value of the calculated second time difference and to produce a sign or binary signal $w_1$ indicative of a positive or negative sign of the calculated second time difference. In the embodiment, the calculated second time difference is used as a value corresponding to the actual acceleration of the vehicle The difference signal w is applied by the calculation circuit 180 to an acceleration output shifter 240, and the sign signal $w_1$ is applied to the correction signal generator 190 and distribution circuit 200.

The shift control circuit 210 is responsive to the reset signal $g_i$ from timing signal generator 130 to produce shift control signals $t_1$ and $t_2$ selectively or simultaneously in relation to the shift command signals $s_1$, $s_2$ and $s_3$ from cancellation circuit 150. Upon receiving both or one of the shift control signals $t_1$, $t_2$ from shift control circuit 210, the speed-difference output shifter 230 serves to select a plurality of binary digits of the difference signal $\underline{v}$ from speed-difference calculation circuit 170 in relation to each level of the shift control signals $t_1$, $t_2$, the output shifter 230 then forming a binary coded signal $v_a$ defined by the selected binary digits. The acceleration output shifter 240 is responsive to both or one of the shift control signals $t_1$, $t_2$ to select a plurality of binary digits of the difference signal w from acceleration calculation circuit 180 in relation to each level of the shift control signals $t_1$, $t_2$, the output shifter 240 then forming a binary coded signal $w_a$ defined by the selected binary digits.

Upon receiving the preset signal $e_i$ from timing signal generator 130 during disappearance of the operation signal $m_b$ from control signal generator 140, the correction signal generator 190 calculates the value of binary coded signal $w_a$ from output shifter 240 in accordance with a series of the fourth clock signals $C_4$ from clock circuit 110 and to generate first and second correction signals $z_1$ and $z_2$ defined by the calculated value of binary coded signal $w_a$ relative to the signal signals $v_1$, $w_1$ from calculation circuits 170, 180. When the correction signal generator 190 receives the preset signal $e_i$ from timing signal generator 130 during presence of the operation signal $m_b$, the correction signal generator 190 calculates the values of binary coded signal $w_a$, $v_a$ from output shifters 230, 240 respectively in accordance with each series of the third and fourth clock signals $C_3$, $C_4$ and generates first and second correction signals $z_1$ and $z_2$ defined by the calculated values of binary coded signals $w_a$, $v_a$ relative to the sign signals $v_1$, $w_1$. The first and second correction signals $z_1$ and $z_2$ from correction signal generator 190 are applied to the distribution circuit 200.

After disappearance of the set signal $\underline{c}$ from control signal generator 140, the distribution circuit 200 acts to produce a first distribution signal $K_1$ in response to the operation signal $m_a$ from control signal generator 140. The distribution circuit 200 also produces a second distribution signal $K_2$ in response to the acceleration and operation signals n and $m_a$ from control signal generator 140. Furthermore, the distribution circuit 200 selectively produces the second distribution signal $K_2$ and a third distribution signal $K_3$ in response to the operation signal $m_a$, the sign signal $w_1$ from calculation circuit 180 and the correction signals $z_1$, $z_2$ from correction signal generator 190. The first to third distribution signals $K_1$, $K_2$ and $K_3$ from distribution circuit 200 are respectively applied to a drive circuit 220. While the release signal h from cancel switch 50 disappears, the drive circuit 220 is responsive to the first distribution signal $K_1$ from distribution circuit 200 to produce a first drive signal for energizing the electromagnetic coil 21a of clutch mechanism 21. The drive circuit 220 is also responsive to the second and third distribution signals $K_2$ and $K_3$ during disappearance of the release signal h to produce second and third drive signals for rotating the reversible motor 20 clockwise and counter-clockwise respectively. Each of the first to third drive signals from drive circuit 220 disappears in response to the release signal $\underline{h}$ from cancel switch 50.

Figure 2:
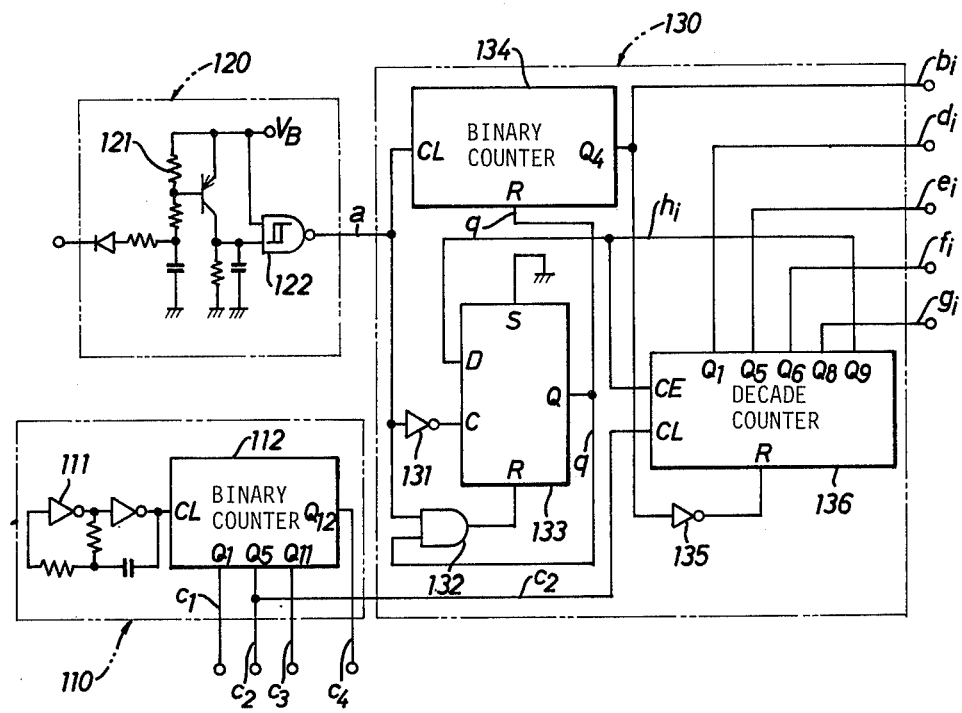
FIG. 2 illustrates circuit diagrams of the wave shaper, clock circuit and timing signal generator respectively shown in block form in FIG. 1.

In FIG. 2, there are illustrated preferred embodiments respectively of the clock circuit 110, the wave shaper 120 and the timing signal generator 130. The clock circuit 110 includes a binary counter 112 which receives a series of pulse signals issued from an oscillator 111 and counts the same pulse signals in such a manner as to produce each series of the first, second, third and fourth clock signals $C_1$, $C_2$, $C_3$ and $C_4$ respectively at its output terminals $Q_1$, $Q_5$, $Q_{11}$ and $Q_{12}$. In the embodiment, frequencies of the first, second, third and fourth clock signals $C_1$, $C_2$, $C_3$ and $C_4$ are determined as 128 KHz, 8 KHz, 125 Hz and 62.5 Hz respectively. The wave shaper 120 is provided with a switching circuit 121 for receiving a series of the electric signals from speed sensor 30. Each of the electric signals from sensor 30 is reshaped by the switching circuit 121 and applied as a reshaped signal in sequence to a NAND-gate 122 of CD 4093 type manufactured by RCA Corporation in U.S.A. NAND-gate 122 has a Schmitt-trigger function to conduct generation of the rectangular pulse signal $\underline{a}$ (see FIG. 3) sequentially in response to each reshaped signal from switching circuit 121.

The timing signal generator 130 includes a D-flip flop 133 which is connected to the wave shaper 120 through an inverter 131 and an AND-gate 132. AND-gate 132 acts to produce a reset pulse at the leading edge of pulse signal $\underline{a}$ from wave shaper 120 upon receiving a high level signal $\underline{q}$ (see FIG. 3) from D-flip flop 133 of CD 4013 type manufactured by RCA Corporation. After reset by the reset pulse from AND-gate 132, D-flip flop 133 receives a high level signal $h_i$ (see FIG. 3) from a decade counter 136 to conduct generation of the high level signal q under control of inverter 131 in response to the trailing edge of pulse signal a. When D-flip flop 133 is again reset by a reset signal following the above reset pulse from AND-gate 132, it makes the high level signal q a low level signal.

The timing signal generator 130 also includes a binary counter 134 of CD 4024 type manufactured by RCA Corporation. The binary counter 134 is reset by the high level signal q from D-flip flop 133 and counts a series of the pulse signals $\underline{a}$ from wave shaper 120 to produce a high level signal as the gate signal $b_i$ at its output terminal $Q_4$. The period of time $T_i$ of gate signal $b_i$ corresponds to a frequency which is one-eighth as high as that of the pulse signal a, the leading edge of gate signal $b_i$ being in synchronization with the trailing edge of pulse signal $\underline{a}$ (see FIG. 3). The decade counter 136 is of CD 4017 type which is manufactured by RCA Corporation. When released from reset condition by an inverter 135 at the leading edge of gate signal $b_i$, the decade counter 136 counts a series of the second clock signals $C_2$ from clock circuit 110 to produce the latch signal $d_i$, the preset signal $e_i$, the reset signals $f_i$ and $g_i$ and the high level signal $h_i$ respectively at its output terminals $Q_1$, $Q_5$, $Q_6$, $Q_8$ and $Q_9$ in sequence (see FIG. 3). In the embodiment, these signals $d_i$, $e_i$, $f_i$, $g_i$ and $h_i$ are produced during generation of gate signal $b_i$, the high level signal $h_i$ dropping to a low level when the counter 136 is reset by the inverter 135 at the trailing edge of gate signal $b_i$.

FIG. 4 illustrates a preferred embodiment of the control signal generator 140 which includes a wave shaper 141a for receiving the electric signal from set switch 40 to produce the set signal c (see FIG. 5). The set signal $\underline{c}$ is applied to a NAND-gate 141b and the distribution circuit 200. NAND-gate 141b acts to produce a high level signal in response to one of the set signal $\underline{c}$ and a low level signal from an OR-gate 146c. The high level signal from NAND-gate 141b is made a low level signal when the set signal c and the low level signal from OR-gate 146c are at a high level respectively. The high or low level signal from NAND-gate 141b is applied to an RS-flip flop 141 which is under control of an OR-gate 141c responsive to one of the reset signal $f_i$ from timing signal generator 130 and a reset signal from a power-on reset circuit 144. The power-on reset circuit 144 includes a NAND-gate 144b which has Schmitt-trigger function and is connected to a vehicle battery through a time-constant circuit 144a. Upon receiving a DC voltage $V_B$ from the battery, the time-constant circuit 144a acts to produce a high level signal which has a width defined by a predetermined time-constant of circuit 144a. The high level signal from time-constant circuit 144a is waveformed under the Schmitt-trigger function of NAND-gate 144b into the above-noted reset signal.

After reset by OR-gate 141c in response to the reset signal from power-on reset circuit 144, the RS-flip flop 141 receives the high level signal from NAND-gate 141b at its set terminal S to produce a high level signal i at its output terminal Q (see FIG. 5). The high level signal i from RS-flip flop 141 is applied to a D-flip flop 142a. When the RS-flip flop 141 receives at its reset terminal R the reset signal $f_i$ from timing signal generator 130 through OR-gate 141c immediately after release of set switch 40, the high level signal i from RS-flip flop 141 is made a low level signal. After reset by the reset signal from power-on reset circuit 144, D-flip flop 142a receives the high level signal i from RS-flip flop 141 to produce a high level signal as the command-speed set signal j in response to a preset signal $e_i$ issued from timing signal generator 130 immediately after release of set switch 40 (see FIG. 5). The command-speed set signal j from D-flip flop 142a drops to a low level in response to a preset signal $e_i$ issued from timing signal generator 130 after disappearance of the high level signal i.

After reset by the reset signal from reset circuit 144, a D-flip flop 142b receives the command-speed set signal j from D-flip flop 142a to produce a high level signal k (see FIG. 5) in response to the latch signal $d_i$ from timing signal generator 130. The high level signal k from D-flip flop 142b is made a low level signal in response to a latch signal $d_i$ issued from timing signal generator 130 after disappearance of the command-speed set signal j. After reset by the reset signal from reset circuit 144, a D-flip flop 142c receives the high level signal k from D-flip flop 142b to produce a high level signal in response to the latch signal $d_i$ from timing signal generator 130. The high level signal from D-flip flop 142c is applied to an RS-flip flop 143 and becomes a low level signal in response to a latch signal $d_i$ issued from timing signal generator 130 after disappearance of the high level signal k. RS-flip flop 143 receives the command-speed set signal j from D-slip flop 142a at its reset terminal R to produce a low level signal at its output terminal Q as the operation signal $m_b$ (see FIG. 5). This means disappearance of operation signal $m_b$. When the RS-flip flop 143 receives the high level signal from D-flip flop 142c at its set terminal S, it makes the operation signal $m_b$ a high level signal. This means appearance of operation signal $m_b$.

The control signal generator 140 is also provided with a wave shaper 146a for reshaping the electric signal from acceleration switch 60 and with wave shapers 145a and 148a for respectively reshaping the release and resume signals h and p from cancel and resume switches 50 and 70. The reshaped electric signal from wave shaper 146a is applied to NAND-gate 141b through OR-gate 146c as the above-noted low level signal and is also inverted by an inverter 146b into the acceleration signal n. The reshaped resume signal from wave shaper 148a is inverted by an inverter 148b into a high level signal. An RS-flip flop 147 is provided to produce a low level signal at its output terminal Q upon receiving at its reset terminal R one of the reset signal and the release signal $r_1$ respectively from power-on reset circuit 144 and cancellation circuit 150 through an OR-gate 147a. When the command-speed set signal j from D-flip flop 142a is applied to the set terminal S of RS-flip flop 147, the low level signal from RS-flip flop 147 is made a high level signal.

An AND-gate 148 acts to produce a high level signal in response to the high level signals respectively from RS-flip flop 147 and inverter 148b. The high level signal from AND-gate 148 becomes a low level signal when one of the high level signals from RS-flip flop 147 and inverter 148b drops to a low level. After reset by an OR-gate 149b responsive to the reset signal from reset circuit 144, an RS-flip flop 149 acts to produce a low level signal as the operation signal $m_a$ under control of an OR-gate 149a in response to one of the command-speed set signal j from D-flip flop 142a and the high level signal from AND-gate 148. The operation signal $m_a$ is applied to NAND-gate 141b through OR-gate 146c as the above-noted low level signal and disappears under control of OR-gates 145b, 149b responsive to one of the reshaped release signal from wave shaper 145a and the release signal $r_2$ from cancellation circuit 150.

Figure 6:
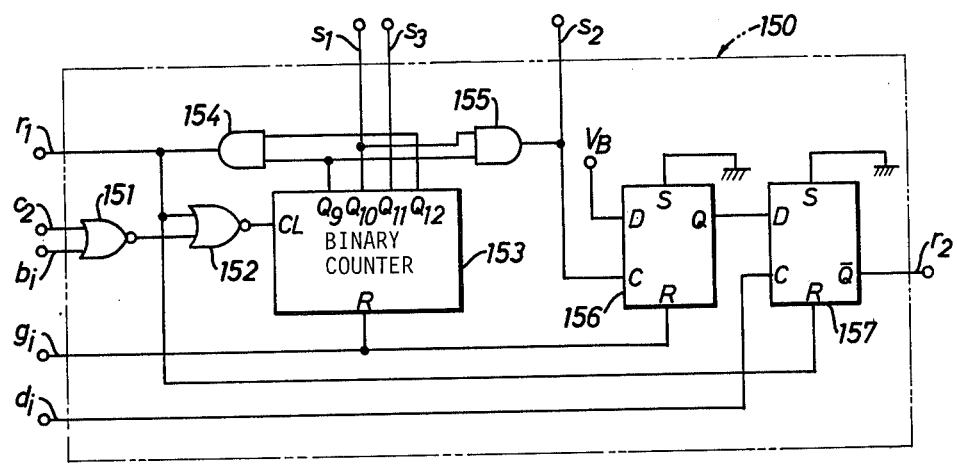
FIG. 6 is a circuit diagram of the cancellation circuit shown in block form in FIG. 1.

FIG. 6 illustrates a preferred embodiment of the cancellation circuit 150 which comprises a binary counter 153 connected to the clock circuit 110 and timing signal generator 130 through NOR-gates 151, 152. When each of the gate and release signals $b_i$ and $r_1$ respectively from timing signal generator 130 and an AND-gate 154 is at a low level, NOR-gate 152 receives a series of the second clock signals $C_2$ from clock circuit 110 through NOR-gate 151 to produce the same. This means that a series of the second clock signals $C_2$ substantially within the period of time $T_i$ of gate signal $b_i$ during the low level of release signal $r_1$ appear from NOR-gate 152. When the release signal $r_1$ from AND-gate 154 rises to a high level, NOR-gate 152 acts to inhibit a series of the second clock signals $C_2$ passing therethrough. In the embodiment, the duration defined by the low level of gate signal $b_i$ is assumed equal substantially to the period of time $T_i$ because the width of gate signal $b_i$ is very narrow.

The binary counter 153 is of CD 4020 type which is manufactured by RCA Corporation. After reset by the reset signal $g_i$ from timing signal generator 130, the counter 153 acts to count the number of second clock signals $C_2$ which are produced in sequence from NOR-gate 152 within the period of time $T_i$ of gate signal $b_i$. Then, the counter 153 acts to produce binary signals respectively at its output terminals $Q_9$, $Q_{10}$, $Q_{11}$ and $Q_{12}$ in dependence upon the counted number of clock signals $C_2$. In case the counted number of counter 153 is under 768, the binary signal from the output terminal $Q_9$ of counter 153 appears as a high level signal, and each of the binary signals from the output terminals $Q_{10}$ to $Q_{12}$ of counter 153 appears as a low level signal. In case the counted number of counter 153 is not less than 768 and under 1024, each of the binary signals from the output terminals $Q_9$, $Q_{10}$ of counter 153 appears as a high level signal, and each of the binary signals from the output terminals $Q_{11}$, $Q_{12}$ of counter 153 appears as a low level signal.

In case the counted number of counter 153 is not less than 1024 and under 1536, the binary signals from the output terminals $Q_9$, $Q_{10}$ and $Q_{11}$ of counter 153 appear respectively as a high level signal in sequence in relation to increase of the counted number of counter 153. At this stage, the binary signal from the output terminal $Q_{12}$ of counter 153 appears as a low level signal. In case the counted number of counter 153 is not less than 1536 and under 2304, each of the binary signals from the output terminals $Q_9$, $Q_{10}$ and $Q_{11}$ of counter 153 appears as a high level signal in sequence in relation to increase of the counted number of counter 153, and another binary signal from the output terminal $Q_{10}$ of counter 153 produces as a high level signal during generation of the binary signal with high level from the output terminal $Q_{11}$ of counter 153. At this stage, the binary signal from the output terminal $Q_{12}$ of counter 153 appears as a low level signal. In case the counted number of counter 153 is not less than 2304, the binary signals from the output terminals $Q_9$, $Q_{12}$ of counter 153 appear as a high level signal respectively, and the binary signals from the output terminals $Q_{10}$, $Q_{11}$ of counter 153 appear as a low level signal respectively.

In the embodiment, the high level signals from the output terminals $Q_{10}$, $Q_{11}$ of counter 153 are used respectively as the above-noted shift command signals $s_1$, $s_3$. Furthermore, the number of under 768 corresponds to the vehicle speed of more than 117.7 km/h, the number of under 1024 corresponds to the vehicle speed of more than 88.3 km/h, the number of under 1536 corresponds to the vehicle speed of more than 58.9 km/h, the number of under 2304 corresponds to the vehicle speed of more than 40 km/h, and the number of not less than 2304 corresponds to the vehicle speed of 40 km/h or less. Additionally, counting operation of counter 153 stops in response to the inhibition of NOR-gate 152 passing the clock signals $C_2$ therethrough.

AND-gate 154 acts to produce a high level signal as the release signal $r_1$ in response to the high level signals from the output terminals $Q_9$, $Q_{12}$ of counter 153. When one of the high level signals from the output terminals $Q_9$, $Q_{12}$ of counter 153 is at a low level, the release signal $r_1$ is made a low level signal by AND-gate 154. This means that the release signal $r_1$ is maintained in a high level at the vehicle speed of less than 40 km/h. An AND-gate 155 acts to produce a high level signal as the above-noted shift command signal $s_2$ in response to the high level signals from the output terminals $Q_9$, $Q_{10}$ of counter 153. When one of the high level signals from the output terminals $Q_9$, $Q_{10}$ of counter 153 is at a low level, the shift command signal $s_2$ drops to a low level. This means that generation of the shift command signal $s_2$ is maintained at the vehicle speed of less than 117.7 km/h and ceased at the vehicle speed of 117.7 km/h or more. A D-flip flop 156 serves to produce a low level signal in response to one of the reset signal $g_i$ from timing signal generator 130 and the low level signal from AND-gate 155. D-flip flop 156 also produces a high level signal in response to the high level signal from AND-gate 155. When reset by the release signal $r_1$ from AND-gate 154, a D-flip flop 157 acts to produce a high level signal as the release signal $r_2$ at its output terminal $\overline{Q}$. The release signal $r_2$ from D-flip flop 157 is also produced in response to the latch signal $d_i$ from timing signal generator 130 and the low level signal from D-flip flop 156 when the release signal $r_1$ from AND-gate 154 is at a low level. Furthermore, the release signal $r_2$ drops to a low level in response to the latch signal $d_i$ and the high level signal from D-flip flop 156 when the release signal $r_1$ from AND-gate 154 is at a low level. This means that generation of the release signal $r_2$ from D-flip flop 157 is maintained at the vehicle speed of 117.7 km/h or more and less than 40 km/h.

Figure 7:
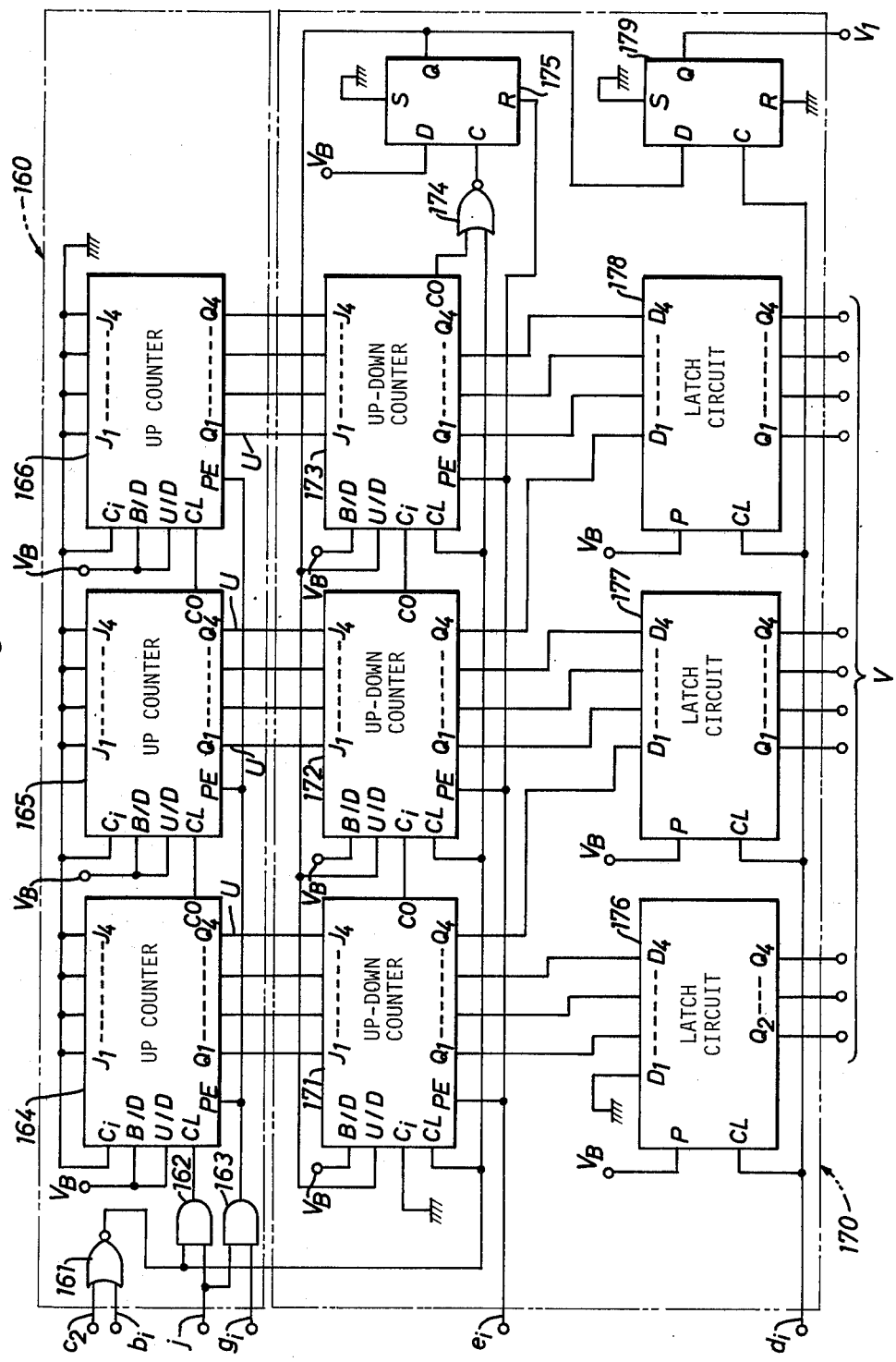
FIG. 7 illustrates circuit diagrams of the command-speed set circuit and speed-difference calculation circuit respectively shown in block form in FIG. 1.

In FIG. 7, there are respectively illustrated preferred embodiments of the command-speed set circuit 160 and the speed-difference claculation circuit 170. The command-speed set circuit 160 includes presettable up-down counters 164, 165 and 166 which are respectively of CD 4029 type manufactured by RCA Corporation and connected, as shown in FIG. 7, to function as a twelve-bit up-counter circuit. The counters 164, 165 and 166 are respectively reset by AND-gate 163 responsive to the reset and command-speed signals $g_i$ and $j$ respectively from timing and control signal generators 130 and 140 and cooperate with each other to count up a series of the clock signals $C_2$ issued through NOR-gate 161 and an AND-gate 162 from clock circuit 110 within the period of time $T_i$ of gate signal $b_i$ during generation of the command-speed set signal $j$. Upon completing the counting up operation under control and AND-gate 162 responsive to disappearance of the command-speed set signal $j$, the counters 164, 165 and 166 maintain or store therein the counted value as a binary coded signal $u$ indicative of the period of time $T_i$ of gate signal $b_i$. This means that the binary coded signal $u$ indicates the length of time corresponding to the desired or command speed of the vehicle upon closure of set switch 40. In addition, the counters 164, 165 and 166 act to stop their counting up operations under control of AND-gate 162 responsive to disappearance of the command-speed set signal $j$ and to store therein the binary coded signal $u$ until the control circuit EC becomes inoperative.

The speed-difference calculation circuit 170 includes a D-flip flop 175 which is controlled by a NOR-gate 174 and the timing signal generator 130. D-flip flop 175 is reset in response to the preset signal $e_i$ from timing signal generator 130 to produce a low level signal at its output terminal Q. D-flip flop 175 also serves to produce a high level signal at its output terminal Q upon receiving the DC voltage $V_B$ from the vehicle battery under control of NOR-gate 174 responsive to drop of one of the clock signals $C_2$ from NOR-gate 161 to a low level immediately after a presettable up-down counter 173 generates a low level signal at its carry-out CO, as described later.

Figure 3:
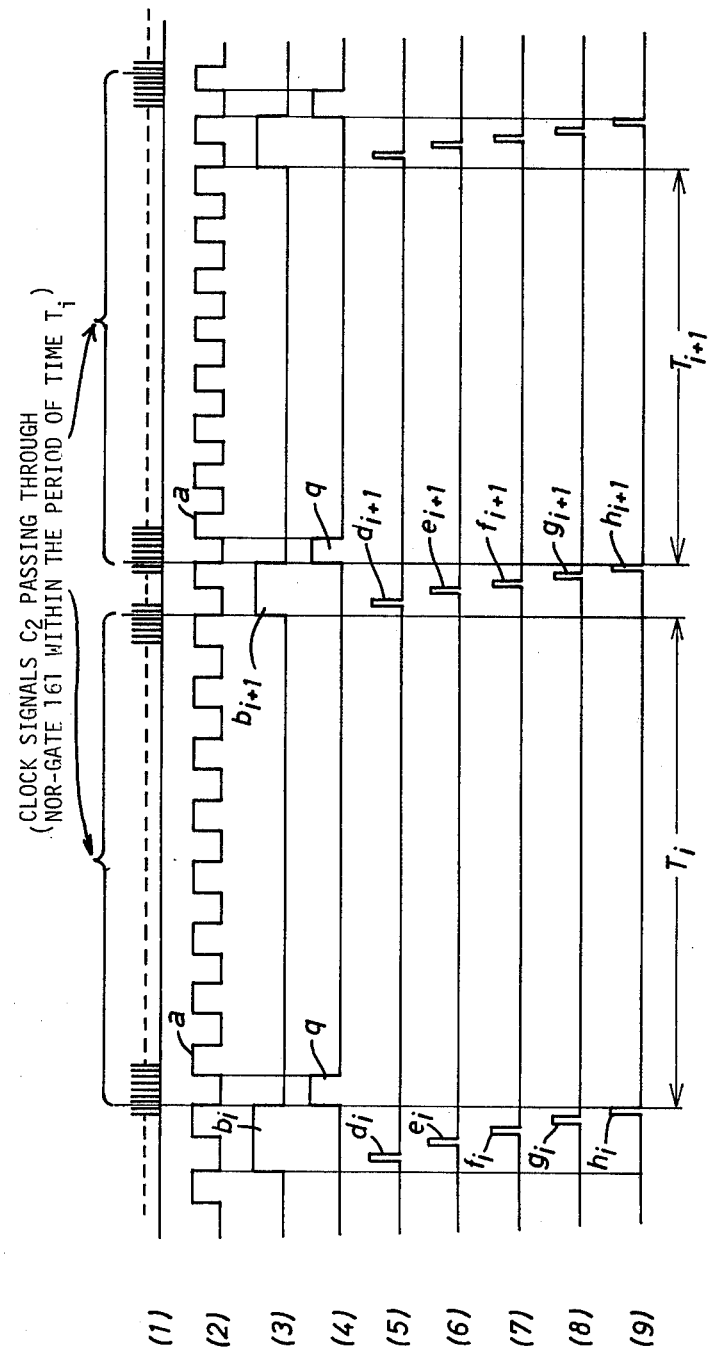
FIG. 3 illustrates waveforms obtained at various points in the wave shaper and timing signal generator.

The speed-difference calculation circuit 170 also includes presettable up-down counters 171, 172 and 173 which are respectively of CD 4029 type manufactured by RCA Corporation and connected, as shown in FIG. 7, to function as a twelve-bit up-down counter circuit. The up-down counters 171, 172 and 173 are responsive to the preset signal $e_i$ from timing signal generator 130 to preset therein the binary coded signal $u$ from command-speed set circuit 160. Then, the counters 171, 172 and 173 cooperate with each other to count down the value of binary coded signal $u$ in accordance with a series of the second clock signals $C_2$ passing through OR-gate 161 within the period of time $T_i$ of gate signal $b_i$ during generation of the low level signal from D-flip flop 175. During this codnting down operation, the counter 173 generates the above-noted high level signal at its carry-out terminal CO. In case the period of time $T_{i+1}$ of gate signal $b_{i+1}$ following the gate signal $b_i$ is shorter than the period of time $T_i$, as shown in FIG. 3, the counters 171, 172 and 173 act to complete their counting down operations during generation of the low level signal from D-flip flop 175 to produce a binary coded signal indicating an absolute value of a time difference between the period of time $T_i$ of binary coded signal u and the period of time $T_{i+1}$ of gate signal $b_{i+1}$. In this case, the above-noted time difference has a positive sign defined by the low level signal from D-flip flop 175.

In case the period of time $T_{i+1}$ of gate signal $b_{i+1}$ is longer than the period of time $T_i$, the counters 171, 172 and 173 act to drop the high level signal from the carry-out terminal CO of counter 173 to a low level upon completing their counting down operations and are responsive to the high level signal from D-flip flop 175 to count up the remainder of the second clock signals $C_2$ passing through NOR-gate 161 within the period of time $T_{i+1}$. Upon completing the counting up operations, the counters 171, 172 and 173 serve to produce a binary coded signal indicating an absolute value of another time difference between the period of time $T_{i+1}$ and the period of time $T_i$ of binary coded signal u. In this case, another time difference has a negative sign defined by the high level signal from D-flip flop 175. In addition, the binary signal appearing from an output terminal $Q_4$ of counter 173 may be neglected because it is unnecessary to the embodiment.

The speed-difference calculation circuit 170 further includes latch circuits 176, 177 and 178 which are controlled by the timing signal generator 130. The latch circuits 176, 177 and 178 are responsive to the latch signal $d_i$ from timing signal generator 130 to latch and produce the binary coded signal from counters 171, 172 and 173 as the difference signal v. A D-flip flop 179 acts to produce a low level signal at its output terminal Q in response to the latch signal $d_i$ and low level signal from D-flip flop 175. D-flip flop 179 also produces a high level signal in response to latch signal $d_i$ and the high level signal from D-flip flop 175. In other words, the high level signal from D-flip flop 175 is produced from D-flip flop 179 as the sign signal $v_1$ with the high level or negative sign in response to the latch signal $d_i$, and the low level signal from D-flip flop 175 is also produced from D-flip flop 179 as the sign signal $v_1$ with the low level or positive sign in response to the latch signal $d_i$.

From the above description, it will be clearly recognized that a vehicle speed $V_s$ satisfies the following equation (1) in relation to the period of time $T_i$ of gate signal $b_i$ from timing signal generator 130.

$$T_i = \beta/V_s \qquad (1)$$

where the character $\beta$ indicates a constant. Assuming that the vehicle command-speed upon closure of the set switch 40 is $V_{so}$ and that the actual vehicle speed is $(V_{so} - \Delta V_s)$, a time difference $\Delta T$ is represented by the following equation (2).

$$\Delta T = \beta \left( \frac{1}{V_{so} - \Delta V_s} - \frac{1}{V_{so}} \right) \qquad (2)$$

-continued
$$= \frac{\beta \Delta V_s}{(V_{so} - \Delta V_s) V_{so}}$$

$$\approx \frac{\beta \Delta V_s}{V_{so}^2} \quad (\because V_{so}^2 >> \Delta V_s V_{so})$$

where the character $\Delta V_s$ indicates a difference between the vehicle command-speed $V_{so}$ and the actual vehicle speed. This means that the time difference $\Delta T$ is substantially proportional to the speed difference $\Delta V_s$. Consequently, it should be understood that the binary coded signal v from the latch circuits 176, 177 and 178 indicates the time difference $\Delta T$ corresponding with the speed difference $\Delta V_s$.

Figure 8:
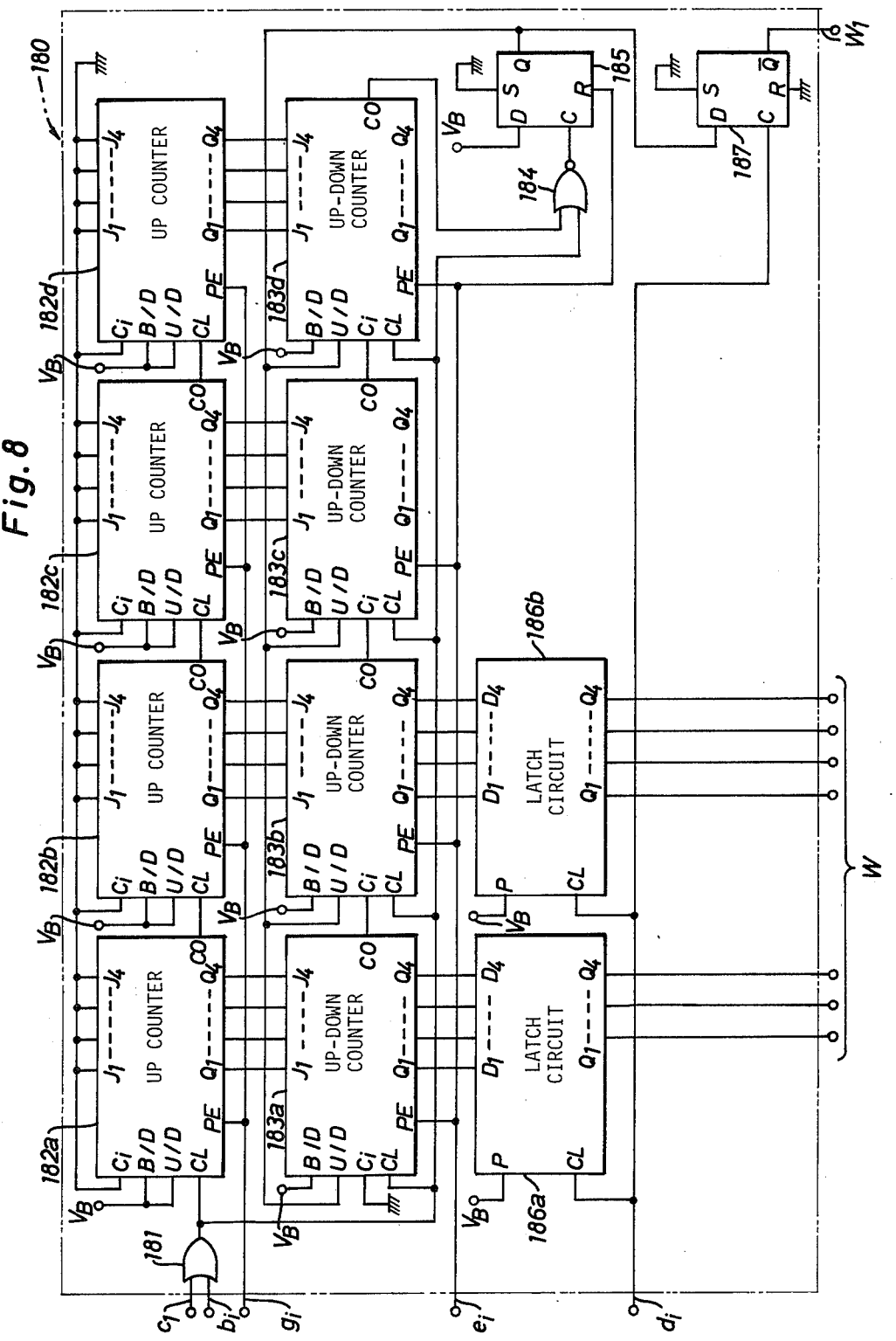
FIG. 8 is a circuit diagram of the acceleration calculation circuit shown in block form in FIG. 1.

FIG. 8 illustrates a preferred embodiment of the acceleration calculation circuit 180 which includes presettable up-down counters 182a, 182b, 182c and 182d controlled by an OR-gate 181 and the timing signal generator 130. The presettable up-down counters 182a to 182d are respectively of CD 4029 type manufactured by RCA Corporation and connected, as shown in FIG. 8, to function as a sixteen-bit up counter circuit. After reset by the reset signal $g_i$ from timing signal generator 130, the counters 182a to 182d cooperate with each other to count up a series of the first clock signals $C_1$ issued from clock circuit 110 through OR-gate 181 within the period of time $T_i$ of gate signal $b_i$. Upon completion of their counting up operations, the counters 182a to 182d act to latch therein the counted resultant value as a binary coded signal indicative of the period of time $T_i$ of gate signal $b_i$ to be applied to presettable up-down counters 183a to 183d.

The acceleration calculation circuit 180 also includes a D-flip flog 185 which is controlled by a NOR-gate 184 and the timing signal generator 130. D-flip flop 185 is reset in response to the present signal $e_i$ from timing signal generator 130 to produce a low level signal at its output terminal Q. D-flip flop 185 also produces a high level signal at its output terminal Q upon receiving the DC voltage $V_B$ from the vehicle battery under control of NOR-gate 184 responsive to drop of one of a series of the first clock signals $C_1$ issued through OR-gate 181 from clock circuit 110 immediately after the counter 183c generates a low level signal at its carry-out terminal CO, as described later.

The presettable up-down counters 183a, 183b, 183c and 183d are respectively of CD 4029 type manufactured by RCA Corporation and connected, as shown in FIG. 8, to function as a sixteen-bit up-down counter circuit. The up-down counters 183a to 183d are responsive to the preset signal $e_i$ from timing signal generator 130 to preset therein in the binary coded signal from counters 182a to 182d. Then, the counters 183a to 183d cooperate with each other to count down the value of the preset binary coded signal in accordance with a series of the first clock signals $C_1$ passing through OR-gate 181 within the period of time $T_i$ of gate signal $b_i$ during generation of the low level signal from D-flip flop 185. During this counting down operation, the counter 183d acts to produce the above-noted high level signal at its carry-out terminal CO. In case the period of time $T_{i+1}$ of gate signal $b_{i+1}$ following the gate signal bx is shorter than the period of time $t_i$, the counters 183a to 183d act to complete their counting down operations during generation of the low level signal from D-flip flop 185 to produce a binary coded signal indicating an abosolute value of a time difference between the period of time $T_i$ of gate signal $b_i$ and the period of time $T_{i+1}$ of gate signal $b_{i+1}$. In this case, the above-noted time difference has a positive sign defined by the low level signal from D-flip flop 185.

In case the period of time $T_{i+1}$ of gate signal $b_{i+1}$ is longer than the period time of $T_i$, the counters 183a to 183d act to drop the high level signal from the carry-out terminal CO of counter 183d to a low level upon completing their counting down operations and are responsive to the high level signal from D-flip flop 185 to count up the remainder of the first clock signals $C_1$ passing through OR-gate 181 within the period of time $T_{i+1}$. Upon completing the counting up operations, the counters 183a to 183d serve to produce a binary coded signal indicating an absolute value of another time difference between the period of time $T_{i+1}$ of gate signal $b_{i+1}$ and the period of time $T_i$ of gate signal $b_i$. In this case, another time difference has a negative sign defined by the high level signal. In addition, binary signals from output terminals $Q_1$ to $Q_4$ of counters 183c, 183d are neglected because they are considered to be unnecessary in the embodiment.

The acceleration calculation circuit 180 further includes a pair of latch circuits 186a, 186b which are controlled by the timing signal generator 130. The latch circuits 186a, 186b are responsive to the latch signal $d_i$ from timing signal generator 130 to latch and produce the binary coded signal from counters 183a, 183b as the difference signal $\underline{w}$. A D-flip flop 187 acts to produce a high level signal at its output terminal $\overline{Q}$ in response to the latch signal $d_i$ and the low level signal from D-flip flop 185. D-flip flop 187 also produces a low level signal in response to the latch signal $d_i$ and the high level signal from D-flip flop 185. In other words, the high level signal from D-flip flop 185 is produced from D-flip flop 187 as the sign signal $w_1$ with a low level or negative sign in response to the latch signal $d_i$, and the low level signal from D-flip flop 185 is produced from D-flip flop 187 as the sign signal $w_1$ with a high level or positive sign in response to the latch signal $d_i$.

Figure 9:
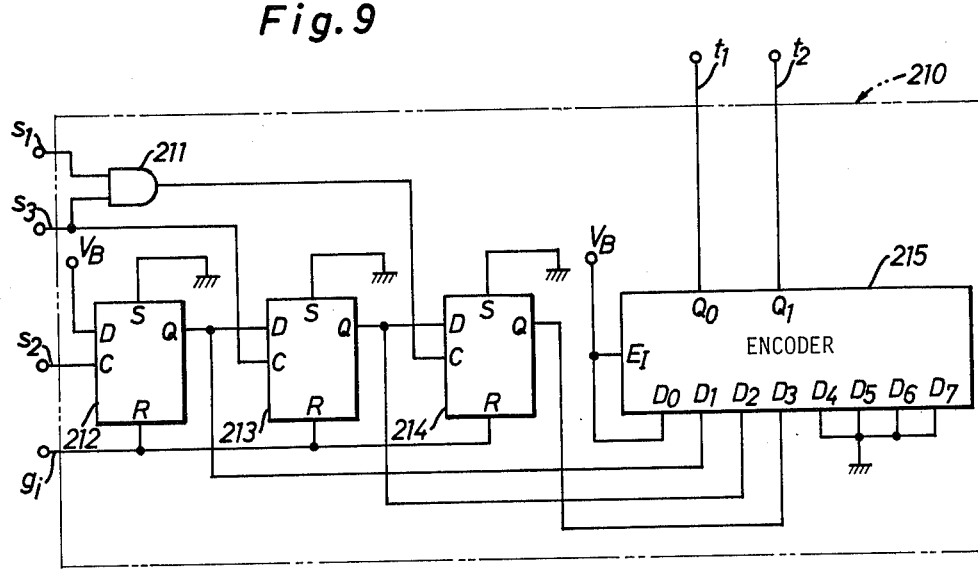
FIG. 9 is a circuit diagram of the shift control circuit shown in block form in FIG. 1.

FIG. 9 illustrates a preferred embodiment of the shift control circuit 210 which comprises an AND-gate 211 and D-flip flops 212, 213 and 214. AND-gate 211 is responsive to the shift command signals $s_1$, $s_3$ from cancellation circuit 150 to produce a high level signal. The high level signal from AND-gate 211 drops to a low level when one of the shift command signals $s_1$, $s_3$ drops to a low level. D-flip flop 212 is reset by the reset signal $g_i$ from timing signal generator 130 to generate a low level signal. Generation of the low level signal from D-flip flop 212 is also conducted when the shift command signal $s_2$ from cancellation circuit 150 is at a low level. D-flip flop 212 acts further to produce a high level signal when the shift command signal $s_2$ appears from cancellation circuit 150. After reset by the reset signal $g_i$ from timing signal generator 130, D-flip flop 213 receives the low or high level signal from D-flip flop 212 to produce a low or high level signal in response to the shift command signal $s_3$ from cancellation circuit 150. D-flip flop 214 is also reset by the reset signal $g_i$ and receives the low or high level signal from D-flip flop 213 to produce a low or high level signal in response to the high level signal from AND-gate 211.

The shift control circuit 210 also comprises an encoder 215 of TC4532 type which is manufactured by TOKYO SHIBAURA DENKI KABUSHIKI KAISHA in Japan. The encoder 215 is provided with input terminals $E_I$ and $D_0$ for receiving the DC voltage $V_B$ from the vehicle battery and also with input terminals $D_1$, $D_2$ and $D_3$ respectively for receiving the high or low level signals from D-flip flops 212, 213 and 214, input terminals $D_4$ to $D_7$ of encoder 215 being grounded. Upon receipt of the low level signals from D-flip flops 212 to 214, the encoder 215 acts to produce low level signals as the shift control signals $t_1$ and $t_2$ respectively at its output terminals $Q_0$ and $Q_1$. The encoder 215 is responsive to the high level signal from D-flip flop 212 during generation of each low level signal from D-flip flops 213, 214 to produce high and low level signals as the shift control signals $t_1$ and $t_2$ respectively at its output terminals $Q_0$ and $Q_1$. When the high level signal appears from D-flip flop 213 during generation of the low level signal from D-flip flop 214, the encoder 215 also produces low and high level signals as the shift control signals $t_1$, $t_2$ respectively. Furthermore, the encoder 215 is responsive to the high level signal from D-flip flop 214 to produce high level signals respectively as the shift control signals $t_1$, $t_2$.

Hereinafter, operation of the shift control circuit 210 is described in relation to that of the cancellation circuit 150. During travel of the vehicle with a speed of under 58.9 km/h, the cancellation circuit 150 is in dependence upon increase of the counted number to produce shift command signals $s_1$, $s_2$ and $s_3$ in sequence and to produce another shift command signal $s_1$ during generation of the shift command signal $s_3$. Then, D-flip flop 212 is responsive to the shift command signal $s_2$ to produce a high level signal so that a high level signal is produced from D-flip flop 213 in response to the shift command signal $s_3$. Subsequently, AND-gate 211 of shift control circuit 210 is responsive to the shift command signals $s_1$, $s_3$ to produce a high level signal such that D-flip flop 214 produces a high level signal during generation of the hight level signal from D-flip flop 213. This means that order of generation of each high level signal from D-flip flops 212, 213 and 214 is defined by that of each of the shift command signals $s_2$, $s_3$ and the high level signal from AND-gate 211 in such a manner as to produce shift control signals $t_1$, $t_2$ of high levels from encoder 215.

During travel of the vehicle with speed of 58.9 km/h or more and under 88.3 km/h, the cancellation circuit 150 is in dependence upon increase of the counted number to produce shift command signals $s_1$, $s_2$ and $s_3$ in sequence and to produce another shift command signal $s_1$. Then, D-flip flops 212, 213 produce a high level signal respectively, as previously described, and AND-gate 211 produces a low level signal to conduct generation of a low level signal from D-flip flop 214, because one of the shift command signals $s_1$, $s_3$ is at a low level. This means that order of generation of each high level signal from D-flip flops 212, 213 is defined by that of the shift command signals $s_2$, $s_3$ during generation of the low level signal from D-flip flop 214. Thus, the encoder 215 serves to produce a shift control signal $t_1$ of a low level and a shift control signal $t_2$ of a high level.

During travel of the vehicle with speed of 88.3 km/h or more and under 117.7 km/h, the cancellation circuit 150 acts to simultaneously produce shift command signals $s_1$, $s_2$ and produces a shift command signal $s_3$ as a low level signal to conduct generation of a low level signal from AND-gate 211. Then, D-flip flop 212 is responsive to the shift command signal $s_2$ to produce a high level signal, and D-flip flops 213, 214 are respectively responsive to the shift command signal $s_3$ of low level and the low level signal from AND-gate 211 to produce low level signals. This conducts generation of a shift control signal $t_1$ of high level from encoder 215 and also conducts generation of a shift control signal $t_2$ of low level from encoder 215. Furthermore, during travel of the vehicle with speed of 117.7 km/h or more, all the shift command signals $s_1$, $s_2$ and $s_3$ from cancellation circuit 150 are maintained respectively in a low level to conduct generation of each low level signal from D-flip flops 212 to 214. This produces each of shift control signals $t_1$, $t_2$ from encoder 215 as a low level signal.

Figure 10:
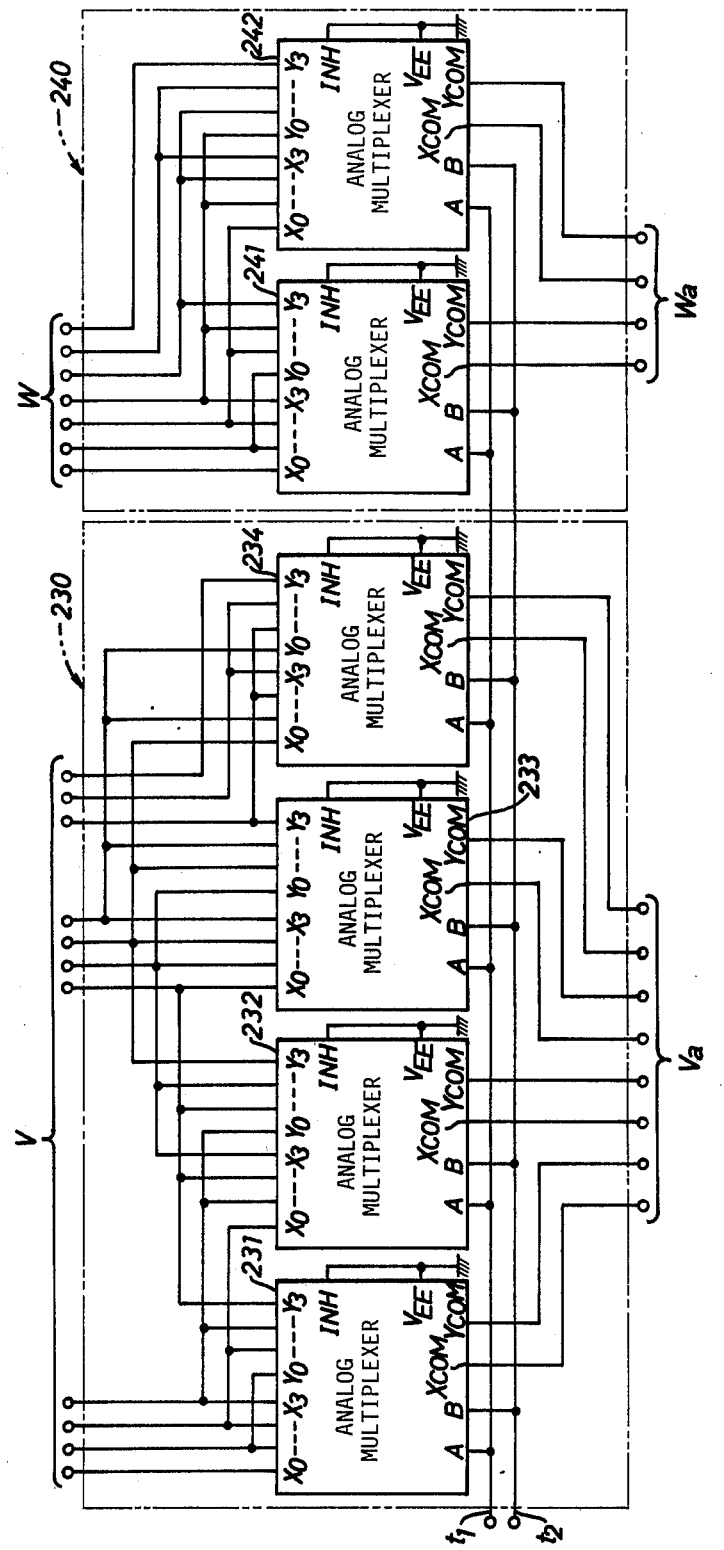
FIG. 10 illustrates circuit diagrams of the speed-difference and acceleration output shifters respectively shown in block form in FIG. 1.

In FIG. 10, there are respectively illustrated preferred embodiments of the speed-difference and acceleration output shifters 230 and 240. The speed-difference output shifter 230 comprises analog multiplexers 321, 232, 233 and 234 which are respectively of CD 4052 type manufactured by RCA Corporation. Upon receipt of the shift control signals $t_1$ and $t_2$ of high levels from shift control circuit 210 respectively at its control terminals A and B, the multiplexer 231 receives the binary signals from the output terminals $Q_1$ and $Q_2$ of latch circuit 177 at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 231 receives the binary signals from the output terminal $Q_4$ of latch circuit 176 and the output terminal $Q_1$ of latch circuit 177 at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 231 receives the binary signals from the output terminals $Q_3$ and $Q_4$ of latch circuit 176 at its input terminals $X_1$ and $Y_1$ to produce the same signals at its output terminals $X_{COM}$ and $Y_{COM}$ respectively. When each of the shift control signals $t_1$, $t_2$ is at a low level, the multiplexer 231 receives the binary signals from the output terminals $Q_2$ and $Q_3$ of latch circuit 176 at its input terminals $X_0$ and $Y_0$ to produce the same signals at its output terminals $X_{COM}$ and $Y_{COM}$ respectively.

Upon receipt of the shift control signals $t_1$ and $t_2$ of high levels from shift control circuit 210 respectively at its control terminals A and B, the analog multiplexer 232 receives the binary signals from the output terminals $Q_3$ and $Q_4$ of latch circuit 177 at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 232 receives the binary signals from the output terminals $Q_2$ and $Q_3$ of latch circuit 177 at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 232 receives the binary signals from the output terminals $Q_1$ and $Q_2$ of latch circuit 177 at its input terminals $X_1$ and $Y_1$ to produce the same signals at its output terminals $X_{COM}$ and $Y_{COM}$ respectively. When each of the shift control signals $t_1$ and $t_2$ is at a low level, the multiplexer 232 receives the binary signals from the output terminal $Q_4$ of latch circuit 176 and the output terminal $Q_1$ of latch circuit 177 at its input terminals $X_0$ and $Y_0$ to produce the same signals at its output terminals $X_{COM}$ and $Y_{COM}$ respectively.

Upon receiving the shift control signals $t_1$ and $t_2$ of high levels from shift control circuit 210 respectively at its control terminals A and B, the analog multiplexer 233 receives the binary signals from the output terminals $Q_1$ and $Q_2$ of latch circuit 178 at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 233 receives the binary signals from the output terminal $Q_4$ of latch circuit 177 and the output terminal $Q_1$ of latch circuit 178 at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 233 receives the binary signals from the output terminals $Q_3$ and $Q_4$ of latch circuit 177 at its input terminals $X_1$ and $Y_1$ to produce the same signals at its output terminals $X_{COM}$ and $Y_{COM}$ respectively. When each of the shift control signals $t_1$, $t_2$ is at a low level, the multiplexer 233 receives the binary signals from the output terminals $Q_2$ and $Q_3$ of latch circuit 177 at its input terminals $X_0$ and $Y_0$ to produce the same signals at its output terminals $X_{COM}$ and $Y_{COM}$ respectively.

Upon receiving the shift control signals $t_1$ and $t_2$ of high levels from shift control circuit 210 respectively at its control terminals A and B, the analog multiplexer 234 receives the binary signals from the output terminals $Q_3$ and $Q_4$ of latch circuit 178 at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 234 receives the binary signals from the output terminals $Q_2$ and $Q_3$ of latch circuit 178 at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 234 receives the binary signals from the output terminals $Q_1$ and $Q_2$ of latch circuit 178 at its input terminals $X_1$ and $Y_1$ to produce the same signals at its output terminals $X_{COM}$ and $Y_{COM}$ respectively. When each of the shift control signals $t_1$, $t_2$ is at a low level, the multiplexer 234 receives the binary signals from the output terminal $Q_4$ of latch circuit 177 and the output terminal $Q_1$ of latch circuit 178 at its input terminals $X_0$ and $Y_0$ to produce the same signals at its output terminals $X_{COM}$ and $Y_{COM}$ respectively.

As understood from the above description, the binary signals from the output terminals $Q_1$ to $Q_4$ of each of latch circuits 177, 178 are produced from binary coded signal $v_a$ when the shift control signals $t_1$ and $t_2$ are at a high level respectively. This means that at the vehicle speed of less than 58.9 km/h, the binary coded signal $v_a$ is formed by the binary signals corresponding to first to eighth high-order digits of the value of binary coded signal v from calculation circuit 170. When the shift control signals $t_1$ and $t_2$ are at low and high levels respectively, the binary signals from the output terminal $Q_4$ of latch circuit 176, the output terminals $Q_1$ to $Q_4$ of latch circuit 177 and the output terminals $Q_1$ to $Q_3$ of latch circuit 178 are produced from the analog multiplexers 231 to 234 as the binary coded signal $v_a$. This means that at the vehicle speed of 58.9 km/h or more and under 88.3 km/h, the binary coded signal $v_a$ is formed by the binary signals corresponding to the second to ninth high-order digits of the value of binary coded signal v.

When the shift control signals $t_1$ and $t_2$ are at high and low levels respectively, the binary signals from the output terminals $Q_3$ and $Q_4$ of latch circuit 176, the output terminals $Q_1$ to $Q_4$ of latch 177 and the output terminals $Q_1$ to $Q_3$ of latch circuit 178 are produced from the analog multiplexers 231 to 234 as binary coded signal $v_a$. This means that at the vehicle speed of 88.3 km/h or more and under 117.7 km/h, the binary coded signal $v_a$ is formed by the binary signals corresponding to the third to tenth high-order digits of the value of binary coded signal $\underline{v}$. When the shift control signals $t_1$ and $t_2$ are at a low level respectively, the binary signals from the output terminals $Q_2$ to $Q_4$ of latch circuit 176, the output terminals $Q_1$ to $Q_4$ of latch circuit 177 and the output terminal $Q_1$ of latch circuit 178 are produced from the analog multiplexers 231 to 234 as the binary coded signal $v_a$. This means that at the vehicle speed of 117.7 km/h or more, the binary coded signal $v_a$ is formed by the binary signals corresponding to the fourth to eleventh high-order digits of the value of binary coded signal $\underline{v}$.

In summary, it will be understood that as a period of time corresponding to the vehicle speed becomes shorter, the binary signals to be selected by the output shifter 230 from the binary coded signal $\underline{v}$ as the binary coded signal $v_a$ are shifted by the shift control circuit 210 from the high-order to the low-order.

The acceleration output shifter 240 is provided with a pair of analog multiplexers 241 and 242 each of which is of CD 4052 type manufactured by RCA Corporation. Upon receipt of the shift control signals $t_1$ and $t_2$ of high levels from shift control circuit 210 respectively at its control terminals $\underline{A}$ and $\underline{B}$, the multiplexer 241 receives the binary signals from the output terminals $Q_1$ and $Q_2$ of latch circuit 186b at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 241 receives the binary signals from the output terminal $Q_4$ of latch circuit 186a and the output terminal $Q_1$ of latch circuit 186b at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 241 receives the binary signals from the output terminals $Q_3$ and $Q_4$ of latch circuit 186a at its input terminals $X_1$ and $Y_1$ to produce the same signals at its output terminals $X_{COM}$ and $Y_{COM}$ respectively. When each of the shift control signals $t_1$, $t_2$ is at a low level, the multiplexer 241 receives the binary signals from the output terminals $Q_2$ and $Q_3$ of latch circuit 186a at its input terminals $X_0$ and $Y_0$ to produce the same signals at its output terminals $X_{COM}$ and $Y_{COM}$ respectively.

Upon receiving the shift control signals $t_1$ and $t_2$ of high levels from shift control circuit 210 respectively at its control terminals $\underline{A}$ and $\underline{B}$, the analog multiplexer 242 receives the binary signals from the output terminals $Q_3$ and $Q_4$ of latch circuit 186b at its input terminals $X_3$ and $Y_3$ to produce the same signals at its output terminals $X_{COM}$ and $Y_{COM}$ respectively. When the shift control signals $t_1$ and $t_2$ are at low and high levels respectively, the multiplexer 242 receives the binary signals from the output terminals $Q_2$ and $Q_3$ of latch circuit 186b at its input terminals $X_2$ and $Y_2$ to produce the same signals at its output terminals $X_{COM}$ and $Y_{COM}$ respectively. When the shift control signals $t_1$ and $t_2$ are at high and low levels respectively, the multiplexer 242 receives the binary signals from the output terminals $Q_1$ and $Q_2$ of latch circuit 186b at its input terminals $X_1$ and $Y_1$ to produce the same signals at its output terminals $X_{COM}$ and $Y_{COM}$ respectively. When each of the shift control signals $t_1$ and $t_2$ is at a low level, the multiplexer 242 receives the binary signals from the output terminal $Q_4$ of latch circuit 186a and the output terminal $Q_1$ of latch circuit 186b at its input terminals $X_0$ and $Y_0$ to produce the same signals at its output terminals $X_{COM}$ and $Y_{COM}$ respectively.

As understood from the above description, the binary signals from the output terminals $Q_1$ to $Q_4$ of latch circuit 186b are produced from the analog multiplexers 241, 242 as the above-noted binary coded signal $w_a$ when the shift control signals $t_1$ and $t_2$ are at a high level respectively. This means that at the vehicle speed of less than 58.9 km/h, the binary coded signal $w_a$ is formed by the binary signals corresponding to first to fourth high-order digits of the value of binary coded signal w from calculation circuit 180. When the shift control signals $t_1$ and $t_2$ are at low and high levels respectively, the binary signals from the output terminal $Q_4$ of latch circuit 186a and the output terminals $Q_1$ to $Q_3$ of latch circuit 186b are produced from the analog multiplexers 241, 242 as the binary coded signal $w_a$. This means that at the vehicle speed of 58.9 km/h or more and under 88.3 km/h, the binary coded signal $w_a$ is formed by the binary signals corresponding to the second to fifth high-order digits of the value of binary coded signal $\underline{w}$.

When the shift control signals $t_1$ and $t_2$ are at high and low levels respectively, the binary signals from the output terminals $Q_3$ and $Q_4$ of latch circuit 186a and the output terminals $Q_1$ and $Q_2$ of latch circuit 186b are produced from the multiplexers 241, 242 as the binary coded signal $w_a$. This means that at the vehicle speed of 88.3 km/h or more and under 117.7 km/h, the binary coded signal $w_a$ is formed by the binary signals corresponding to the third to sixth high-order digits of the value of binary coded signal w. When the shift control signals $t_1$ and $t_2$ are at a low level respectively, the binary signals from the output terminals $Q_2$ to $Q_4$ of latch circuit 186a and the output terminal $Q_1$ of latch circuit 186b are produced from the multiplexers 241, 242 as the binary coded signal $w_a$. This means that at the vehicle speed of 117.7 km/h or more, the binary coded signal $w_a$ is formed by the binary signals corresponding to the fourth to seventh high-order digits of the value of binary coded signal $\underline{w}$.

In summary, it will be understood that as the above-noted period of time becomes shorter, the binary signals to be selected by the output shifter 240 from the binary coded signal $\underline{w}$ as the binary coded signal $w_a$ are shifted by the shift control circuit 210 from the high-order to the low-order.

Figure 11:
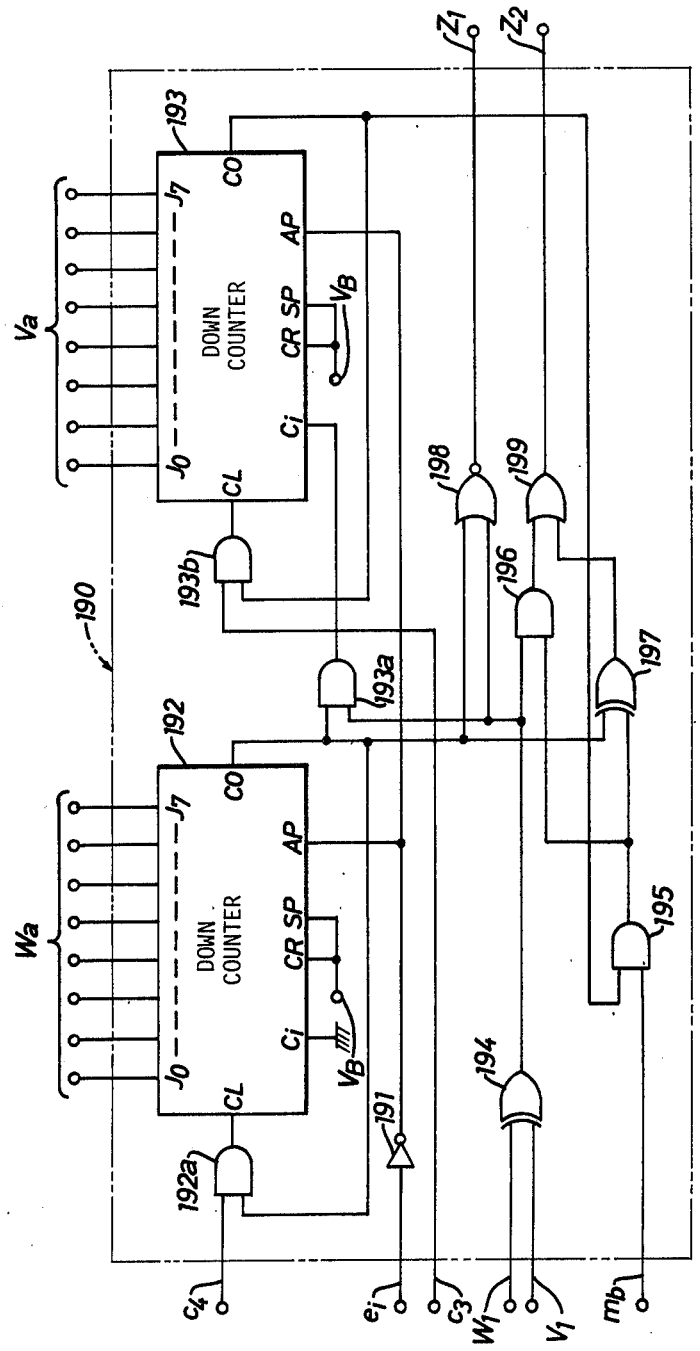
FIG. 11 is a circuit diagram of the correction signal generator shown in block form in FIG. 1.

In FIG. 11, there is illustrated a preferred embodiment of the correction signal generator 190 which includes a presettable down counter 192 of CD 40103 type manufactured by RCA Corporation. The counter 192 is provided with jam input terminals $J_0$ to $J_7$ for receiving the binary coded signal $w_a$ from acceleration output shifter 240 and with an asynchronous preset-enable terminal AP controlled by an inverter 191 responsive to the preset signal $e_i$ from timing signal generator 130. The counter 192 is also provided with clear and synchronous preset-enable terminals CR and SP respectively for receiving the DC voltage $V_B$ from the vehicle battery and with a clock terminal CL for receiving a series of the fourth clock signals $C_4$ issued from clock circuit 110 through an AND-gate 192a while it produces a high level signal at its carry-out terminal CO, as described later, a carry-in terminal $C_i$ of counter 192 being grounded. The down counter 192 serves to preset therein the binary coded signal $w_a$ under control of inverter 191 responsive to generation of the preset signal $e_i$ from timing signal generator 130. When the preset signal $e_i$ disappears, the counter 192 starts to count down a value of binary coded signal $w_a$ due to function of inverter 191 in accordance with a series of the clock signals $C_4$ from AND-gate 192a and produces the high level signal at its carry-out terminal CO. Upon counting the value of binary coded signal $w_a$ down to zero, the high level signal from the carry-out terminal CO of counter 192 drops to a low level to inhibit the counting operation of counter 192 under control of AND-gate 192a. The above-noted operation in counter 192 is repeated in response to each preset signal $e_i$ from timing signal generator 130 such that a high level signal with a width corresponding to the value of binary coded signal $w_a$ is repetitively produced from the carry-out terminal CO of counter 192.

The correction signal generator 190 also includes a presettable down counter 193 of CD 40103 type which is manufactured by RCA Corporation. The down counter 193 is provided with jam input terminals $J_0$ to $J_7$ for receiving the binary coded signal $v_a$ from speed-difference output shifter 230 and with a carry-in terminal $C_i$ controlled by an AND-gate 193a responsive to each function of the down counter 192 and an exclusive OR-gate 194. The down counter 193 is also provided with a clock terminal CL for receiving a series of the third clock signals $C_3$ issued from clock circuit 110 through an AND-gate 193b while it produces a high level signal at its carry-out terminal CO, as described later. Other constructions of the down counter 193 is the same as those of the down counter 192. The exclusive OR-gate 194 serves to produce a low level signal when each of the sign signals $v_1$ and $w_1$ respectively from the speed-difference and acceleration calculation circuits 170 and 180 has a low or high level. The exclusive OR-gate 194 also produces a high level signal when one of the sign signals $v_1$ and $w_1$ has a high level and the other sign signal has a low level. In other words, the high level signal appears from the exclusive OR-gate 194 when each sign of the sign signals $v_1$ and $w_1$ is identical to each other. The low level signal also appears from the exclusive OR-gate 194 when each sign of the sign signals $v_1$ and $w_1$ is opposite to each other.

The down counter 193 serves to preset therein the binary coded signal $v_a$ under control of inverter 191 upon generation of the preset signal $e_i$ from timing signal generator 130 and produces the high level signal at its carry-out terminal CO while counting down operation of the counter 193 is inhibited by AND-gate 193a responsive to the high level signals from down counter 192 and exclusive OR-gate 194. When the counting down operation of counter 193 is permitted by AND-gate 193a responsive to one of the low level signals from down counter 192 and exclusive OR-gate 194, the down counter 193 starts to count down the value of binary coded signal $v_a$ in accordance with a series of the third clock signals $C_3$ from AND-gate 193b due to function of inverter 191 based on disappearance of the preset signal $e_i$. During this counting down operation, the high level signal is continuously produced from the carry-out terminal CO of counter 193. Upon counting the value of binary coded signal $v_a$ down to zero, the high level signal from the carry-out terminal CO of counter 193 drops to a low level to inhibit the counting down operation of counter 193 under control of AND-gate 193b. The above-noted operation in counter 193 is repeated in response to each preset signal $e_i$ from timing signal generator 130 such that a high level signal with a width corresponding to the value of binary coded signal $v_a$ or to a total of the values of binary coded signals $v_a$, $w_a$ is repetitively produced from the carry-out terminal CO of counter 193.

A NOR-gate 198 is provided to produce a low level signal as the first correction signal $z_1$ in response to one of the high level signals from the down counter 192 and exclusive OR-gate 194. When each of the counter 192 and exclusive OR-gate 194 produces the low level signal, a high level signal is produced from NOR-gate 198 as the first correction signal $z_1$. In other words, when each sign of sign signals $v_1$, $w_1$ is identical to each other, the first correction signal $z_1$ is at the low level during counting down operation of counter 192 and rises to the high level upon completion of the counting down operation of counter 192. This means that the first correction signal $z_1$ of low level has a width corresponding to the value of binary coded signal $w_a$. When each sign of sign signals $v_1$, $w_1$ is opposite to each other, the first correction signal $z_1$ remains at the low level regardless of operation of down counter 192.

An AND-gate 195 acts to produce a high level signal in response to the high level signal from down counter 193 during generation of the operation signal $m_b$ from control signal generator 140. The high level signal from AND-gate 195 drops to a low level upon disappearance of the operation signal $m_b$ or drop of the high level signal from counter 193 to a low level. An AND-gate 196 serves to produce a high level signal in response to both of the high level signals from the exclusive OR-gate 194 and AND-gate 195. The high level signal from AND-gate 196 drops to a low level when one of the high level signals from the exclusive OR-gate 194 and AND-gate 195 drops to a low level. An exclusive OR-gate 197 acts to produce a low level signal in response to the low or high level signals from the down counter 192 and AND-gate 195. The low level signal from exclusive OR-gate 197 rises to a high level when one of the low and high level signals is produced from the down counter 192 and the other signal is produced from AND-gate 195. An OR-gate 199 is responsive to at least one of the high level signals from the exclusive OR-gate 197 and AND-gate 196 to produce a high level signal as the second correction signal $z_2$. The second correction signal $z_2$ of high level from OR-gate 199 drops to a low level when both of the high level signals from the exclusive OR-gate 197 and AND-gate 196.

In other words, while the operation signal $m_b$ disappears, the second correction signal $z_2$ remains at a high level during the counting down operation the counting down operation of counter 192. This means that the second correction signal $z_2$ of high level has a width corresponding to the value of binary coded signal $w_a$ regardless of function of the exclusive OR-gate 194. When the sign signals $v_1$, $w_1$ are at an identical level to each other during appearance of the operation signal $m_b$, the correction signal $z_2$ remains at a low level during the counting down operation of each of counters 192, 193 and rises to a high level upon completion of the counting down operation in one of counters 192, 193. This means that the correction signal $z_2$ has a width corresponding to an absolute value $|w_a - v_a|$ of a difference between values of binary coded signals $v_a$, $w_a$. When the sign signals $v_1$, $w_1$ are at an opposite level to each other during appearance of the operation signal $m_b$, the correction signal $z_2$ remains at a high level during the counting down operation of counter 192 and also during the counting down operation of counter 193 caused by completion of the counting down operation of counter 192, the correction signal $z_2$ dropping to a low level upon completion of the counting down operation of counter 193. This means that the correction signal $z_2$ has a width corresponding to an absolute value $|v_a + w_a|$ of a total value of binary coded signals $v_a$, $w_a$.

Figure 12:
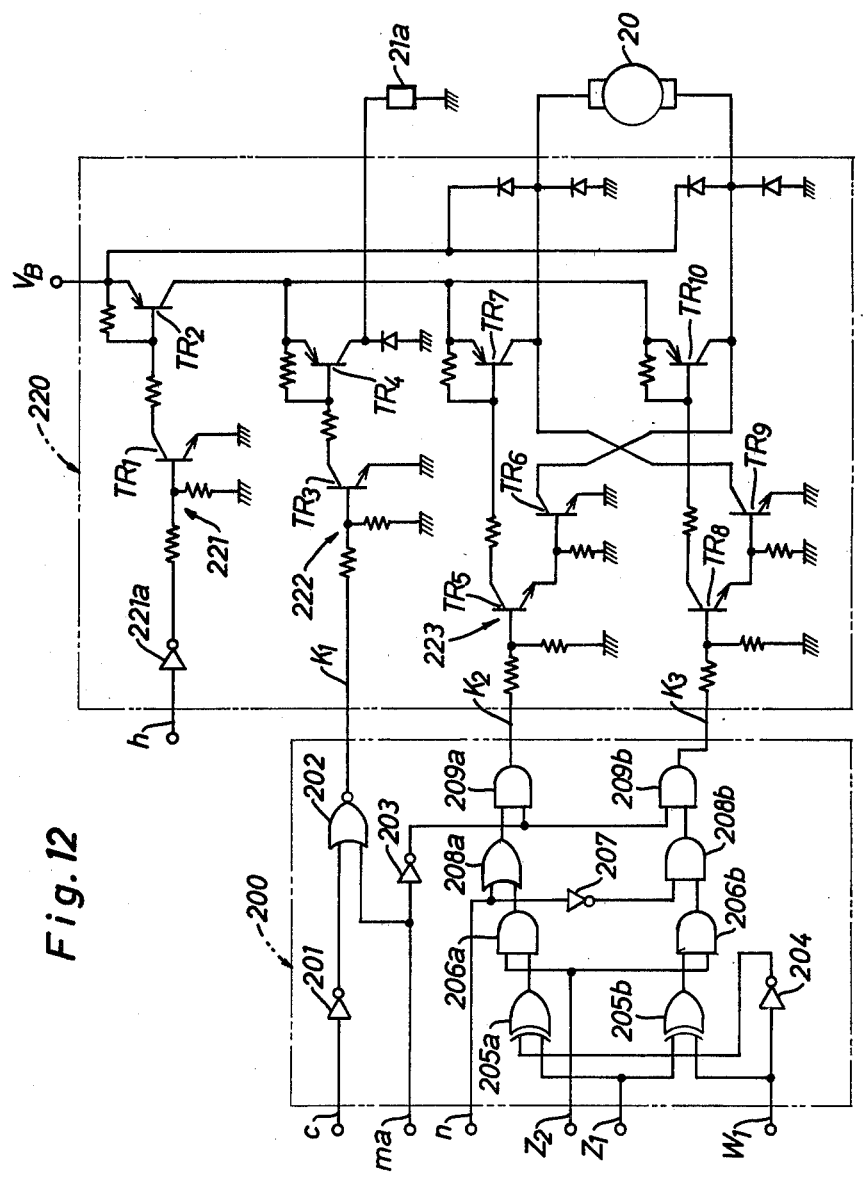
FIG. 12 illustrates circuit diagrams of the distribution and drive circuits respectively shown in block form in FIG. 1.

In FIG. 12, there are illustrated preferred embodiments of the distribution circuit 200 and drive circuit 220. The distribution circuit 200 comprises a NOR-gate 202 which produces a high level signal as the first distribution signal $K_1$ under function of an inverter 201 based on release of set switch 40 during appearance of the operation signal $m_a$ from control signal generator 140. The first distribution signal $K_1$ from NOR-gate 202 drops to a low level upon closure of set switch 40 or disappearance of the operation signal $m_a$. An inverter 204 is provided to invert the sign signal $w_1$ from acceleration calculation circuit 180. The inverted sign signal from inverter 204 is applied to an exclusive OR-gate 205a. The exclusive OR-gate 205a acts to produce a low level signal when the first correction signal $z_1$ from correction signal generator 190 has the same level as that of the inverted sign signal from inverter 204. The exclusive OR-gate 205a also produces a high level signal when the first correction signal $z_1$ has a level opposite to that of the inverted sign signal from inverter 204.

The distribution circuit 200 also comprises an AND-gate 206a which acts to produce a high level signal in response to the high level signal from exclusive OR-gate 205a when the second correction signal $z_2$ from correction signal generator 190 is at a high level. The high level signal from AND-gate 206a drops to a low level when one of the second correction signal $z_2$ and the high level signal from exclusive OR-gate 205a drops to a low level. An inverter 203 acts to invert the operation signal $m_a$ from control signal generator 140. When the inverted operation signal from inverter 203 is at a high level, an AND-gate 209a serves to produce a high level signal as the second distribution signal $K_2$ in response to one of the acceleration signal $\underline{n}$ and high level signal respectively issued from control signal generator 140 and AND-gate 206a through an OR-gate 208a. The second distribution signal $K_2$ from AND-gate 209a drops to a low level when one of the acceleration signal n and the high level and inverted operation signals from AND-gate 206a and inverter 203 drops to a low level.

An exclusive OR-gate 205b is provided to produce a low level signal when the sign and correction signals $w_1$, $z_1$ respectively from acceleration calculation circuit 180 and correction signal generator 190 are at an identical level to each other. The exclusive OR-gate 205b also produces a high level signal when the sign and correction signals $w_1$, $z_1$ are at an opposite level to each other. An AND-gate 206b serves to produce a high level signal in response to the high level signal from exclusive OR-gate 205b when the second correction signal $z_2$ from correction signal generator 190 is at a high level. AND-gate 206b also produces a low level signal when one of the second correction signal $z_2$ and the high level signal from exclusive OR-gate 205b drops to a low level. An AND-gate 208b acts to produce a low level signal under function of an inverter 207 responsive to the acceleration signal n regardless of function of AND-gate 206b. AND-gate 208b also produces a high level signal in response to the high level signal from AND-gate 206b under function of inverter 207 caused by disappearance of the acceleration signal n. When the inverted operation signal from inverter 203 is at a high level, an AND-gate 209b is responsive to the high level signal from AND-gate 208b to produce a high level signal as the third distribution signal $K_3$. The third distribution signal $K_3$ from AND-gate 209b drops to a low level when one of the high level and inverted operation signals respectively from AND-gate 208b and inverter 203 drops to a low level.

In summary, the first to third distribution signals $K_1$ to $K_3$ are respectively derived from distribution circuit 200 in relation to the set, acceleration and operation signals c, n, $m_a$ and $m_b$ from control signal generator 140 and also to the sign signals $v_1$, $w_1$ from cancellation circuits 170, 180, the binary coded signals $v_a$, $w_a$ from output shifters 230, 240 and the correction signals $z_1$, $z_2$ from correction signal generator 190, as follows.

(1) In case the operation signal $m_a$ is at a high level:

The first to third distribution signals $K_1$ to $K_3$ are produced from the distribution circuit 200 as low level signals respectively.

(2) In case the operation signal $m_a$ is at a low level during appearance of the set signal $\underline{c}$:

The first distribution signal $K_1$ is produced from the distribution circuit 200 as a low level signal.

(3) In case the operation signal $m_a$ is at a low level after disappearance of the set signal $\underline{c}$:

The first distribution signal $K_1$ is produced from the distribution circuit 200 as a high level signal.

(4) In case the operation signal $m_a$ is at a low level during appearance of the acceleration signal $\underline{n}$:

The second and third distribution signals $K_2$ and $K_3$ are produced respectively as high and low level signals from distribution circuit 200.

(5) In case each of the operation signals $m_a$, $m_b$ is at a low level during disappearance of the acceleration signal $\underline{n}$:

When the sign and correction signals $w_1$ and $z_1$ are at a low level respectively, the second and third distribution signals $K_2$ and $K_3$ are produced respectively as high and low level signals from the distribution circuit 200, a width of second distribution signal $K_2$ corresponding to the value of binary coded signal $w_a$ which defines the width of correction signal $z_2$ with high level. When the sign and correction signals $w_1$ and $z_1$ are at high and low levels respectively, the second and third distribution signals $K_2$ and $K_3$ are produced respectively as low and high level signals from the distribution circuit 200, a width of the third distribution signal $K_3$ corresponding to the value of binary coded signal $w_a$ which defines the width of correction signal $z_2$.

(6) In case the operation signals $m_a$ and $m_b$ are at low and high levels respectively during disappearance of the acceleration signal $\underline{n}$:

When the sign signal $v_1$ is at a high level and the sign and correction signals $w_1$ and $z_1$ are at a low level respectively, the second and third distribution signals $K_2$ and $K_3$ are produced respectively as high and low level signals from the distribution circuit 200, a width of the second distribution signal $K_2$ corresponding to the total value of binary coded signals $v_a$ and $w_a$ which defines the width of correction signal $z_2$. When the sign signal $w_1$ is at a high level and the sign and correction signals $v_1$ and $z_1$ are at a low level respectively, the second and third distribution signals $K_2$ and $K_3$ are produced respectively as low and high level signals from the distribution circuit 200, a width of the third distribution signal $K_3$ corresponding to the total value of binary coded signals $v_a$ and $w_a$ which defines the width of correction signal $z_2$.

When the value of binary coded signal $w_a$ is larger than that of binary coded signal $v_a$ under the low level of each of the sign signals $v_1$, $w_1$ and correction signal $z_1$, the second and third distribution signals $K_2$ and $K_3$ are produced respectively as high and low level signals from the distribution circuit 200, a width of the second distribution signal $K_2$ corresponding to the absolute value of the difference of each value of binary coded signals $v_a$, $w_a$ which defines the correction signal $z_2$. When the value of binary coded signal $w_a$ is smaller than that of binary coded signal $v_a$ under the low level of each of sign signals $v_1$, $w_1$ and the high level of correction signal $z_1$, the second and third distribution signals $K_2$ and $K_3$ are produced respectively as low and high level signals from the distribution circuit 200, a width of the third distribution signal $K_3$ corresponding to the absolute value of the difference of each value of binary coded signals $v_a$, $w_a$ which defines the correction signal $z_2$.

When the value of binary coded signal $w_a$ is larger than that of binary coded signal $v_a$ under the high level of each of sign signals $v_1$, $w_1$ and the low level of correction signal $z_1$, the second and third distribution signals $K_2$ and $K_3$ are produced respectively as low and high level signals from the distribution circuit 200, a width of the third distibution signal $K_3$ corresponding to the absolute value of the difference of each value of binary coded signals $v_a$, $w_a$ which defines the correction signal $z_2$. When the value of binary coded signal $w_a$ is smaller than that of binary coded signal $v_a$ under the high level of each of the sign signals $v_1$, $w_1$ and correction signal $z_1$, the second and third distribution signals $K_2$ and $K_3$ are produced respectively as high and low level signals from the distribution circuit 200, a width of the second distribution signal $K_2$ corresponding to the absolute value of the difference of each value of binary coded signals $v_a$, $w_a$ which defines the correction signal $z_2$.

The drive circuit 220 comprises a first transistor circuit 221 which is controlled by the cancel switch 50. The first transistor circuit 221 includes a transistor $TR_1$ which is turned on under function of an inverter 221a based on release of the cancel switch 50 such that a transistor $TR_2$ is made conductive to supply the DC voltage $V_B$ from the vehicle battery to second and third transistor circuits 222 and 223. The transistor $TR_1$ is turned off under function of inverter 221a responsive to appearance of the release signal h from cancel switch 50 such that the transistor $TR_2$ is made nonconductive to block the supply of DC voltage $V_B$ from the vehicle battery to the transistor circuits 222, 223. The second transistor circuit 222 includes a transistor $TR_3$ which is turned on in response to the first distribution signal $K_1$ of high level from distribution circuit 200 such that a transistor $TR_4$ is made conductive to produce the above-noted first drive signal under conduction of transistor $TR_2$. The transistor $TR_3$ is turned off in response to the first distribution signal $\bar{K}_1$ of low level such that the transistor $TR_4$ is made nonconductive to cease generation of the first drive signal therefrom.

The third transistor circuit 223 includes a transistor $TR_5$ which is turned on in response to the second distribution signal $K_2$ of high level from distribution circuit 200 such that each of transistors $TR_6$, $TR_7$ is made conductive to produce the above-noted second drive signal from a collector of transistor $TR_7$. The transistors $TR_5$ is turned off in response to the second distribution signal $K_2$ of low level such that each of transistors $TR_6$, $TR_7$ is made nonconductive to cease generation of the second drive signal therefrom. The third transistor circuit 223 also includes a transistor $TR_8$ which is turned on in response to the third distribution signal $K_3$ of high level from distribution circuit 200 such that each of transistor $TR_9$, $TR_{10}$ is made conductive to produce the above-noted third drive signal from a collector of transistor $TR_{10}$. The transistor $TR_8$ is turned off in response to the third distribution signal $K_3$ of low level such that each of transistors $TR_9$, $TR_{10}$ is made nonconductive to cease generation of the third drive signal therefrom. In addition, nonconduction of transistor $TR_2$ ceases generation of each of the first to third drive signals.

OPERATION

When the vehicle starts to travel on a flat road upon depression of the accelerator pedal 14 and the speed control apparatus is ready for its operation, the throttle valve 12 remains at an opening angle defined by the depression of accelerator pedal 14. Each of the reversible motor 20 and clutch mechanism 21 is also maintained inoperative because the drive circuit 220 may not yet produce any drive signals under control of distribution circuit 200 responsive to an operation signal $m_a$ of a high level issued from the control signal generator 140, as understood from the previous description.

At this stage, the cancellation circuit 150 is controlled by the timing signal generator 130 to repetitively produce release signals $r_1$, $r_2$ respectively with a high level and shift control signals $s_1$, $s_2$ and $s_3$ respectively with a low level in accordance with a series of the second clock signals $C_2$ from clock circuit 110, and the control signal generator 140 is responsive to the release signals $r_1$, $r_2$ to maintain generation of the above-noted operation signal $m_a$ with high level, as previously described. The acceleration calculation circuit 180 is also controlled by the timing signal generator 130 to repetitively latch and produce difference and sign signals $\underline{w}$ and $w_1$ in accordance with a series of the first clock signals $C_1$ from clock circuit 110, as previously described. When the actual vehicle speed exceeds 40 km/h, the release signals $r_1$ and $r_2$ from cancellation circuit 150 drop to a low level respectively, and the shift command signals $s_1$, $s_2$ and $s_3$ from cancellation circuit 150 rise to a high level in sequence, another shift command signal $s_1$ with a high level appearing from the cancellation circuit 150 during generation of the shift command signal $s_3$, as previously described. This means that shift control signals $t_1$ and $t_2$ are produced from shift control circuit 210 respectively as a high level signal, as understood from the above description.

When the set switch 40 is temporarily closed upon reaching of the actual vehicle speed to a desired or command value during acceleration of the vehicle, an electric signal is produced from the set switch 40 and reshaped by the wave shaper 141a of control signal generator 140 into a set signal $\underline{c}$ (see FIG. 5). When RS-flip flop 141 produces a high level signal i under function of NAND-gate 141b responsive to the set signal $\underline{c}$, the high level signal $\underline{i}$ is applied to D-flip flop 142a of control signal generator 140. Assuming that immediately after disappearance of set signal $\underline{c}$, the timing signal generator 130 produces a gate signal $b_1$ with a period of time $T_1$ and also produces latch and preset signals $d_1$, $e_1$ and reset signals $f_1$, $g_1$, as previously described, an absolute value of a time difference counted previously in the counters 183a, 183b of calculation circuit 180 is latched and applied by the latch circuits 186a, 186b as a difference signal w to the acceleration output shifter 240 in response to the latch signal $d_1$. At the same time, a sign signal $w_1$ is produced from D-flip flop 187 and applied to the correction signal generator 190 and distribution circuit 200. At this stage, the sign signal $w_1$ has a positive sign defined by a high level because of acceleration of the vehicle. Then, binary signals from the output terminals $Q_1$ to $Q_4$ of latch circuit 186b of calculation circuit 180 are selected by the output shifter 240 from the difference signal $\underline{w}$ in response to the shift control signals $t_1$, $t_2$ respectively with high level from shift control circuit 210 and applied as a binary coded signal $w_a$ to the correction signal generator 190.

When D-flip flop 142a of control signal generator 140 receives the preset signal $e_1$ under generation of the high level signal i from RS-flip flop 141, it produces a command-speed set signal j which is applied to D-flip flop 142b, RS-flip flops 143, 147 and OR-gate 149a and also to the command-speed set signal j from D-flip flop 142a, and simultaneously the operation signal $m_b$ with a low level appears from RS-flip flop 143 of control signal generator 140 in response to the command-speed set signal j from D-flip flop 142a, and simultaneously the operation signal $m_a$ with high level appearing from RS-flip flop 149 of control signal generator 140 drops to a low level such that a first distribution signal $K_1$ is produced from NOR-gate 202 of distribution circuit 200. Thus, the second transistor circuit 222 of drive circuit 220 produces a first drive signal in response to the first distribution signal $K_1$ from NOR-gate 202 to energize the electromagnetic coil 21a of clutch mechanism 21. As a result, the clutch mechanism 21 is engaged due to the energization of coil 21a to connect the rack-and-pinion 22 with the reversible motor 20. Additionally, the high level signal i from RS-flip flop 141 of control signal generator 140 drops to a low level in response to the reset signal $f_1$ from timing signal generator 130.

When the up-down counters 183a to 183d of acceleration calculation circuit 180 receive the preset signal $e_1$ from timing signal generator 130, they preset therein a value counted previously in the up counters 182a to 182d as a binary coded signal and start to count down the same value at the trailing edge of gate signal $b_1$ in accordance with a series of the first clock signals $C_1$ from OR-gate 181. When the down counter 192 of correction signal generator 190 preset therein the binary coded signal $w_a$ from output shifter 240 under control of inverter 191 responsive to the preset signal $e_1$, it starts to count down a value of the same signal $w_a$ in accordance with a series of the fourth clock signals $C_4$ from AND-gate 192a and produces a high level signal at its carry-out terminal CO. Then, NOR-gate 198 is responsive to the high level signal from down counter 192 to produce a first correction signal $z_1$ of a low level, and the exclusive OR-gate 197 receives the high level signal from counter 192 under control of AND-gate 195 responsive to the operation signal $m_b$ of low level from control signal generator 140 and produces a high level signal such that a second correction signal $z_2$ of a high level appears from OR-gate 199.

When the distribution circuit 200 receives the correction signals $z_1$ and $z_2$ respectively with low and high levels, it produces a third distribution signal $K_3$ of a high level in relation to the high level of sign signal $w_1$ so that the transistors $TR_8$, $TR_9$ and $TR_{10}$ of drive circuit 220 are made conductive to produce a third drive signal from the transistor $TR_{10}$, as previously described. Thus, the reversible motor 20 is rotated upon receiving the third drive signal from drive circuit 220 and operates the rack-and-pinion 22 to decrease the actual opening angle of throttle valve 12. As a result, restraint to the actual acceleration of the vehicle is initiated due to the decrease of the throttle opening angle to control the actual vehicle speed toward the desired value.

In the command-speed set circuit 160, the up counters 164 to 166 are reset by AND-gate 163 responsive to the reset signal $g_1$ from timing signal generator 130 during generation of the command-speed set signal j and start to count a series of the second clock signals $C_2$ from AND-gate 162 at the trailing edge of gate signal $b_1$. In the acceleration calculation circuit 180, the up counters 182a to 182d are reset by the reset signal $g_1$ and start to count a series of the first clock signals $C_1$ from OR-gate 181 at the trailing edge of gate signal $b_1$. At this stage, the shift control circuit 210 cooperates with the cancellation circuit 150 to maintain the shift control signals $t_1$ and $t_2$ respectively in a high level because the actual vehicle speed is over 40 km/h and under 58.9 km/h. Additionally, RS-flip flop 147 of control signal generator 140 is responsive to the command-speed set signal j from D-flip flop 142a to produce a high level signal $\overline{to}$ be applied to AND-gate 148.

Upon completion of the counting down operation of counter 192, the high level signal from counter 192 drops to a low level so that the correction signal $z_2$ from OR-gate 199 drops to a low level under function of the exclusive OR-gate 197. Then, the third distribution signal $K_3$ with high level from distribution circuit 200 drops to a low level in response to the correction signal $z_2$ of low level from OR-gate 199 to make the transistors $TR_8$, $TR_9$ and $TR_{10}$ of drive circuit 220 nonconductive. Thus, the rotation of reversible motor 20 is stopped due to the nonconductive of transistors $TR_8$, $TR_9$ and $TR_{10}$ such that the operation of rack-and-pinion 22 is halted to cease the decrease of the throttle opening angle.

When the timing signal generator 130 produces a gate signal $b_2$ with a period of time $T_2$ and also produces latch and preset signals $d_2$, $e_2$ and reset signals $f_2$, $g_2$, as previously described, each counting operation of counters 164 to 166 and 182a to 182d of respective circuits 160 and 180 is completed at the leading edge of gate signal $b_2$, and simultaneously each counting down operation of counters 183a to 183d of circuit 180 is completed. At this stage, the period of time $T_2$ of gate signal $b_2$ is assumed to be a little shorter than that of the gate signal $b_1$ in consideration with the above-noted restraint to acceleration of the vehicle. Then, the period of time $T_1$ of gate signal $b_1$ is memorized by the counters 164 to 166 as a binary coded signal u and is also produced from the up counters 182a to 182d as a binary coded signal. At the same time, a time difference between the period of time $T_1$ and the previously counted value in counters 182a to 182d described above is produced as a binary coded signal from up-down counters 183a, 183b, and a low level signal is also produced from D-flip flop 185. In addition, the period of time $T_1$ is assumed to be shorter than the previously counted value in counters 182a to 182d described above because of acceleration of the vehicle.

Upon receiving the latch signal $d_2$ from timing signal generator 130, D-flip flop 142b of control signal generator 140 acts to produce a high level signal k (see FIG. 5)

during generation of the command-speed set signal j from D-flip flop 142a. In the acceleration calculation circuit 180, the above-noted binary coded signal from up-down counters 183a, 183b is latched by the latch circuits 186a, 186b in response to the latch signal $d_2$ and applied to the output shifter 240 as a difference signal w, and simultaneously the low level signal from D-flip flop 185 is inverted by D-flip flop 187 and applied to the correction signal generator 190 and distribution circuit 200 as a sign signal $w_1$ with a high level or a positive sign. Then, binary signals from the output terminals $Q_1$ to $Q_4$ of latch circuit 186b of calculation circuit 180 are selected by the output shifter 240 from the difference signal w and applied as a binary coded signal $w_a$ to the correction signal generator 190, as previously described. When the preset signal $e_2$ from timing signal generator 130 is applied to the speed-difference and acceleration calculation circuits 170 and 180, the up-down counters 171 to 173 of calculation circuit 170 preset therein the binary coded signal u from command-speed set circuit 160 and start to count down a value of binary coded signal u at the trailing edge of gate signal $b_2$ in accordance with a series of the second clock signals $C_2$ from NOR-gate 161. Simultaneously, the up-down counters 183a to 183d of calculation circuit 180 preset therein the binary coded signal from counters 182a to 182d and start to count down a value of the same signal at the trailing edge of gate signal $b_2$ in accordance with a series of the first clock signals $C_1$. At this stage, D-flip flops 175, 185 of circuits 170, 180 act to produce a low level signal respectively.

Upon presetting therein the binary coded signal $w_a$ from output shifter 240 in response to the preset signal $e_2$, the down counter 192 of correction signal generator 190 starts to count down a value of the binary coded signal $w_a$ and produces a high level signal at its carry-out terminal CO, as previously described. Then, NOR-gate 198 and OR-gate 199 act to produce first and second correction signals $z_1$ and $z_2$ with low and high levels respectively, as previously described. Thus, the distribution circuit 200 cooperates with the transistors $TR_8$ to $TR_{10}$ of drive circuit 220 in response to the correction signals $z_1$ and $z_2$ respectively with low and high levels so that the above-noted rotation of reversible motor 20 is conducted in relation to the high level of sign signal $w_1$ to decrease the actual throttle opening angle, as previously described. This also results in restraint to acceleration of the vehicle. Upon completion of the counting down operation of counter 192, the second correction signal $z_2$ of high level from OR-gate 199 drops to a low level so that the distribution circuit 200 cooperates with the transistors $TR_8$, $TR_9$ and $TR_{10}$ of drive circuit 220 to halt the rotation of reversible motor 20. Additionally, in the acceleration calculation circuit 180, the up counters 182a to 182d are reset by the reset signal $g_2$ from timing signal generator 130 and start to count a series of the first clock signals $C_1$ at the trailing edge of gate signal $b_2$.

When the timing signal generator 130 produces a gate signal $b_3$ with a period of time $T_3$ and also produces latch and preset signals $d_3$, $e_3$ and reset signals $f_3$, $g_3$, as previously described, each counting operation of counters 182a to 182d of circuit 180 is completed at the leading edge of gate signal $b_3$. Simultaneously, each counting down operation of up-down counters 171 to 173 and 183a to 183d of circuits 170 and 180 is completed. At this stage, the period of time $T_3$ of gate signal $b_3$ is assumed to be longer than those of gate signals $T_1$, $T_2$.

Then, a binary coded signal indicative of a time difference $|T_1-T_2|$ is produced from the up-down counters 171 to 173 and also produced from the up-down counters 183a, 183b. At the same time, a binary coded signal indicative of the period of time $T_2$ of gate signal $b_2$ is produced from up counters 182a to 182d.

When the latch signal $d_3$ from timing signal generator 130 is applied to D-flip flop 142c of control signal generator 140, D-flip flop 142c acts to produce a high level signal during generation of the high level signal k from D-flip flop 142b so that the operation signal $m_b$ of low level from RS-flip flop 143 rises to a high level (see FIG. 5). In the speed-difference calculation circuit 170, the binary coded signal from up-down counters 171 to 173 is latched by the latch circuits 176 to 178 in response to the latch signal $d_3$ and applied to the output shifter 230 as a difference signal v indicative of the time difference $|T_1-T_2|$, and simultaneously the low level signal from D-flip flop 175 is produced and applied by D-flip flop 179 to the correction signal generator 190 as a sign signal $v_1$ with a low level or a positive sign. Then, binary signals from the output terminals $Q_1$ to $Q_4$ of each of latch circuits 177, 178 are selected by the output shifter 230 from the difference signal v in response to the shift signals $t_1$, $t_2$ respectively with high level and applied as a binary coded signal $v_a$ to the correction signal generator 190. In the acceleration calculation circuit 180, the binary coded signal from up-down counters 183a, 183b is latched by the latch circuits 186a, 186b in response to the latch signal $d_3$ and applied to the output shifter 240 as a difference signal w indicative of the time difference $|T_1-T_2|$, and simultaneously the low level signal from D-flip flop 185 is inverted by D-flip flop 187 and applied to the correction signal generator 190 and distribution circuit 200 as a sign signal $w_1$ with a high level or a positive sign. Then, binary signals from the output terminals $Q_1$ to $Q_4$ of latch circuit 186b are selected by the output shifter 240 from the difference signal w and applied as a binary coded signal $w_a$ to the correction signal generator 190, as previously described.

When the preset signal $e_3$ from timing signal generator 130 is applied to the correction signal generator 190, the down counters 192 and 193 preset respectively therein the binary coded signals $w_a$ and $v_a$ under control of inverter 191. Then, the counter 192 starts to count down a value of binary coded signal $w_a$ in accordance with a series of the clock signals $C_4$ from AND-gate 192a and produces a high level signal at its carry-out terminal CO. Upon receiving the high level signal from down counter 192, AND-gate 193a acts to produce a high level signal under control of the exclusive OR-gate 194 caused by the sign signals $v_1$, $w_1$ respectively with low and high levels. This inhibits counting down operation of counter 193 and produces a high level signal from the carry-out terminal CO of counter 193. When AND-gate 195 produces a high level signal in response to the high level signal from counter 193 during generation of the operation signal $m_b$ with high level from control signal generator 140, AND-gate 196 produces a second correction signal $z_2$ with a high level through OR-gate 199 under function of the exclusive OR-gate 194 responsive to the sign signals $v_1$, $w_1$ respectively with low and high levels. In addition, NOR-gate 198 acts to produce a first correction signal $z_1$ of a low level due to the above-noted function of exclusive OR-gate 194.

When the distribution circuit 200 receives the correction signals $z_1$ and $z_2$ respectively with low and high levels from correction signal generator 190, it acts to produce a third distribution signal $K_3$ of a high level in relation to the high level of sign signal $w_1$ so that the transistors $TR_8$, $TR_9$ and $TR_{10}$ of drive circuit 220 are made conductive to produce a third drive signal from the transistor $TR_{10}$, as previously described. Thus, rotation of reversible motor 20 is conducted in response to the third drive signal from drive circuit 220 to further decrease the actual throttle opening angle under operation of rack-and-pinion 22. This further restrains the rate of increase of acceleration of the vehicle.

Upon completion of the counting down operation, the down counter 192 produces a low level signal at its carry-out terminal CO so that AND-gate 193a permits counting down operation of counter 193. Then, the counter 193 starts to count down a value of binary coded signal $v_a$ in accordance with a series of the clock signals $C_3$ from AND-gate 193b and continuously produces the high level signal at its carry-out terminal CO. Thus, the correction signal $z_2$ from OR-gate 199 is maintained in high level under control of the exclusive OR-gate 197 responsive to the low and high level signals from down counter 192 and AND-gate 195. Upon completion of the counting down operation, the counter 193 acts to produce a low level signal at its carry-out terminal CO so that the second correction signal $z_2$ of high level from OR-gate 199 drops to a low level under each control of AND-gate 195 and exclusive OR-gate 197. Then, the third distribution signal $K_3$ with high level from distribution circuit 200 drops to a low level in response to the correction signal $z_2$ of low level from OR-gate 199 to make the transistors $TR_8$, $TR_9$ and $TR_{10}$ of drive circuit 220 nonconductive. Thus, the rotation of reversible motor 20 is stopped due to the nonconductive of transistors $TR_8$, $TR_9$ and $TR_{10}$ such that operation of rack-and-pinion 22 is halted to cease the decrease of the throttle opening angle.

From the above description, it will be understood that during disappearance of the operation signal $m_b$ after the actuation of set switch 40, the throttle opening angle is decreased due to a width of the correction signal $z_2$ defined by the value of binary coded signal $w_a$ and that the rate of increase of the actual vehicle speed is effectively restrained to control the vehicle speed toward the command value.

When loads against the vehicle increase under this condition, the actual speed of the vehicle starts to decrease. Then, the decreasing vehicle speed is detected by the speed sensor 30 as a series of electric signals, each of which is reshaped by the wave shaper 120 and applied to the timing signal generator 130 as a rectangular pulse signal a. When the timing signal generator 130 produces a gate signal $b_m$ with a period of time $T_m$ and also produces latch and preset signals $d_m$, $e_m$ and reset signals $f_m$, $g_m$, as previously described, the up-down counters 171 to 173 of speed-difference calculation circuit 170 are responsive to the preset signal $e_m$ to preset therein the binary coded signal u from command-speed set circuit 160. Then, the counters 171 to 173 start to count down the value of binary coded signal $\underline{u}$ at the trailing edge of gate signal $b_m$ in accordance with a series of the second clock signals $C_2$ during generation of a low level signal from D-flip flop 175. In addition, the period of time $T_m$ of gate signal $b_m$ is longer than the period of time $T_1$ of gate signal $b_1$. The period of time $T_m$ is assumed to be longer than a period of time $T_{m-1}$ of a gate signal $b_{m-1}$ which was issued from the timing signal generator 130 prior to the gate signal $b_m$.

Upon receiving the preset signal $e_m$ from timing signal generator 130, the up-down counters 183a to 183d of acceleration calculation circuit 180 preset therein a binary coded signal indicative of the period of time $T_{m-1}$ which was previously counted in the up counters 182a to 182d. Then, the up-down counters 183a to 183d start to count down the period of time $T_{m-1}$ of the same binary coded signal at the trailing edge of gate signal $b_m$ in accordance with a series of the first clock signals $C_1$ during generation of a low level signal from D-flip flop 185. When each of the up-down counters 173 and 183d produces a low level signal at its carry-out terminal CO upon completion of each counting down operation in counters 171 to 173 and 183a to 183d, D-flip flop 175 of calculation circuit 170 produces a high level signal under control of NOR-gate 174 responsive to the low level signal from counter 173. D-flip flop 185 of calculation circuit 180 also produces a high level signal under control of NOR-gate 184 responsive to the low level signal from counter 183d. When the up-down counters 171 to 173 and 183a to 183d receive the high level signals from D-flip flops 175, 185 respectively, they act to up the respective remaining second and first clock signals $C_2$ and $C_1$ within the period of time $T_m$ of gate signal $b_m$. At this stage, the high level signals from D-flip flops 175 and 185 are also applied to D-flip flops 179 and 187 respectively.

When the timing signal generator 130 produces a gate signal $b_{m+1}$ with a period of time $b_{m+1}$ and also produces latch and preset signals $d_{m+1}$, $e_{m+1}$ and reset signals $f_{m+1}$, $g_{m+1}$, as previously described, each counting up operation of counters 171 to 173 and 183a to 183d is completed at the leading edge of gate signal $b_{m+1}$. Then, a binary coded signal indicative of a time difference $|T_1-T_m|$ is produced from the counters 171 to 173 and applied to the latch circuits 176 to 178, the time difference $|T_1-T_m|$ corresponding to the actual speed difference of the vehicle. Simultaneously, a binary coded signal indicative of a time difference $|T_{m-1}-T_m|$ is produced from the counters 183a, 183b and applied to the latch circuits 186a, 186b, the time difference $|T_{m-1}-T_m|$ corresponding to the actual acceleration of the vehicle. Subsequently, the binary coded signal from counters 171 to 173 is latched and applied by the latch circuits 176 and 178 to the output shifter 230 as a difference signal v in response to the latch signal $d_{m+1}$, and simultaneously the high level signal from D-flip flop 175 is produced and applied by D-flip flop 179 to the correction signal generator 190 as a sign signal $v_1$ with a high level or a negative sign. The binary coded signal from counters 183a, 183b is also latched and applied by the latch circuits 186a, 186b to the output shifter 240 as a difference signal w in response to the latch signal $d_{m+1}$, and simultaneously the high level signal from D-flip flop 185 is inverted by D-flip flop 187 and applied to the correction signal generator 190 and distribution circuit 200 as a sign signal $w_1$ with a low level or a negative sign. Then, all the binary signals from latch circuits 177, 178 are applied by the output shifter 230 in response to the shift control signals $t_1$, $t_2$ respectively with high level from shift control circuit 210 to the correction signal generator 190 as a binary coded signal $v_a$, and simultaneously all the binary signals from latch circuit 186b are applied to the correction signal generator 190 as a binary coded signal $w_a$.

When the preset signal $e_{m+1}$ from timing signal generator 130 is applied to the correction signal generator 190, the down counters 192 and 193 preset respectively therein the binary coded signals $w_a$ and $v_a$ under control inverter 191. Then, the counter 192 starts to count down a value of the binary coded signal $w_a$ in accordance with a series of the fourth clock signals $C_4$ from AND-gate 192a so as to produce a high level signal at its carry-out terminal CO. At this stage, AND-gate 193a receives the high level signal from counter 192 to produce a high level signal under control of the exclusive OR-gate 194 responsive to the sign signals $v_1$ and $w_1$ respectively with high and low levels from calculation circuits 170, 180. Then, counting down operation of counter 193 is inhibited due to the high level signal from AND-gate 193a to produce a high level signal from the carry-out terminal CO of counter 193. When AND-gate 195 receives the high level signal from counter 193, it produces a high level signal during generation of the operation signal $m_b$ with high level so that AND-gate 196 produces a second correction signal $z_2$ with a high level through OR-gate 199 under function of the exclusive OR-gate 194 responsive to the sign signals $v_1$ and $w_1$ respectively with high and low levels. In addition, a first correction signal $z_1$ from NOR-gate 198 remains at a low level due to the above-noted function of the exclusive OR-gate 194.

When the distribution circuit 200 receives the correction signals $z_1$ and $z_2$ respectively with low and high levels from correction signal generator 190, it produces a second distribution signal $K_2$ of a high level in relation to the low level of sign signal $w_1$ so that the transistors $TR_5$, $TR_6$ and $TR_7$ of drive circuit 220 are made conductive to produce a second drive signal from the transistor $TR_7$, as previously described. Thus, the reversible motor 20 is rotated upon receiving the second drive signal from drive circuit 220 and operates the rack-and-pinion 22 to increase the actual throttle opening angle. As a result, acceleration of the vehicle is increased due to the increase of the throttle opening angle to control the actual vehicle speed toward the desired value.

Upon completing the counting down operation, the down counter 193 produces a low level signal at its carry-out terminal CO so that AND-gate 193a permits counting down operation of counter 193. Then, the counter 193 starts to count down a value of binary coded signal $v_a$ in accordance with a series of the third clock signals $C_3$ from AND-gate 193b and continuously produces the high level signal at its carry-out terminal CO. Thus, the second correction signal $z_2$ from OR-gate 199 is maintained in high level under control of the exclusive OR-gate 197 responsive to the low and high level signals from down counter 192 and AND-gate 195. Upon completion of the counting down operation, the counter 193 acts to produce a low level signal at its carry-out terminal CO so that the second correction signal $z_2$ of high level from OR-gate 199 drops to a low level under each control of AND-gate 195 and exclusive OR-gate 197. Then, the second distribution signal $K_2$ with high level from distribution circuit 200 drops to a low level in response to the correction signal $z_2$ of low level from OR-gate 199 to make the transistors $TR_5$, $TR_6$ and $TR_7$ of drive circuit 220 nonconductive. Thus, the rotation of reversible motor 20 is stopped due to the nonconduction of transistors $TR_5$, $TR_6$ and $TR_7$ such that the operation of rack-and-pinion 22 is halted to cease the increase of the throttle opening angle.

From the above description, it will be understood that during appearance of the operation signal $m_b$, the opening angle of throttle valve 12 is increased due to a width of the correction signal $z_2$ defined by the sum of each value of binary coded signals $v_a$ and $w_a$ and that the rate of decrease of the actual vehicle speed is effectively restrained to control the vehicle toward the command speed.

Assuming that at this stage the timing signal generator 130 produces a gate signal $b_M$ with a period of time $T_M$ and also produces latch and preset signals $d_M$, $e_M$ and reset signals $f_M$, $g_M$, as previously described, the up-down counters 171 to 173 of calculation circuit 170 are responsive to the preset signal $e_M$ to preset therein the binary coded signal u from command-speed set circuit 160. Then, the counters 171 to 173 start to count down the value of binary coded signal u at the trailing edge of gate signal $b_M$ in accordance with a series of the second clock signals $C_2$ during generation of a low level signal from D-flip flop 175. In addition, the period of time $T_M$ of gate signal $b_M$ is still longer than the period of time $T_1$ of gate signal $b_1$ due to the vehicle loads but is shorter than a period of time $T_{M-1}$ of a gate signal $b_{M-1}$ which was issued from timing signal generator 130 prior to the gate signal $b_M$.

Upon receiving the preset signal $e_M$ from timing signal generator 130, the up-down counters 183a to 183d of calculation circuit 180 preset therein a binary coded signal indicative of the period of time $T_{M-1}$ which was previously counted in the up counters 182a to 182d. Then, the up-down counters 183a to 183d start to count down the period of time $T_{M-1}$ of the same binary coded signal at the trailing edge of gate signal $b_M$ in accordance with a series of the first clock signals $C_1$ during generation of a low level signal from D-flip flop 185. Upon completion of the counting down operation, the counters 183a, 183b produce a binary coded signal indicative of a time difference $|T_{M-1}-T_M|$ or the remaining value of the period of time $T_{M-1}$, the time difference $|T_{M-1}-T_M|$ corresponding to controlled acceleration of the vehicle. When the counter 173 produces a low level signal at its carry-out terminal CO upon completion of each counting down operation in counters 171 to 173, D-flip flop 175 produces a high level signal, as previously described. Upon receiving the high level signal from D-flip flop 175, the up-down counters 171 to 173 start to count up the remaining second clock signals $C_2$ within the period of time $T_M$ of gate signal $b_M$.

When the timing signal generator 130 produces a gate signal $b_{M+1}$ with a period of time $T_{M+1}$ and also produces latch and preset signals $d_{M+1}$, $e_{M+1}$ and reset signals $f_{M+1}$, $g_{M+1}$, as previously described, each counting up operation of counters 171 to 173 is completed at the leading edge of gate signal $b_{M+1}$. Then, a binary coded signal indicative of a time difference $|T_1-T_M|$ is produced from the counters 171 to 173 and applied to the latch circuits 176, 177, the time difference $|T_1-T_M|$ corresponding to controlled speed difference of the vehicle. Subsequently, the binary coded signal from counters 171 to 173 is latched and applied by the latch circuits 176 to 178 to the output shifter 230 as a difference signal $\underline{v}$ in response to the latch signal $d_{M+1}$, and simultaneously the high level signal from D-flip flop 175 is produced and applied by D-flip flop 179 to the correction signal generator 190 as a sign signal $v_1$ with a high level or a negative sign. The binary coded signal from counters 183a, 183b is also latched and applied by the latch circuits 186a, 186b to the output shifter 240 as a difference signal w in response to the latch signal $d_{M+1}$, and simultaneously the low level signal from D-flip flop 185 is inverted by D-flip flop 187 and applied as a sign signal $w_1$ with a high level or a positive sign to the correction signal generator 190 and distribution circuit 200. Then, all the binary signals from latch circuits 177, 178 are applied by the output shifter 230 to the correction signal generator 190 as a binary coded signal $v_a$, and simultaneously all the binary signals from latch circuit 186b are also applied to the correction signal generator 190 as a binary coded signal $w_a$, as previously described.

When the down counters 192 and 193 of correction signal generator 190 receive the preset signal $e_{M+1}$ from timing signal generator 130, they preset respectively therein the binary coded signals $w_a$ and $v_a$ under control of inverter 191. Then, the counter 192 starts to count down a value of the binary coded signal $w_a$ in accordance with a series of the fourth clock signals $C_4$ and produces a high level signal at its carry-out terminal CO. When AND-gate 193a receives the high level signal from down counter 192 under function of the exclusive OR-gate 194 responsive to the sign signals $v_1$, $w_1$ respectively with high level, it acts to produce a low level signal in such a manner as to permit counting down operation of counter 193. Then, the down counter 193 starts to count down a value of the binary coded signal $v_a$ in accordance with a series of the third clock signals $C_3$ and produces a high level signal at its carry-out terminal CO. This means that the counting down operation of down counter 193 is started simultaneously with that of the down counter 192. When NOR-gate 198 receives the high level signal from down counter 192, it acts to produce a first correction signal $z_1$ of a low level. When the high level signals from down counters 192 and 193 are applied to the exclusive OR-gate 197 and AND-gate 195 respectively, AND-gate 195 produces a high level signal during appearance of the operation signal $m_b$ to produce a low level signal from the exclusive OR-gate 197. Meanwhile, AND-gate 196 is controlled by the exclusive OR-gate 194 in response to the sign signals $v_1$, $w_1$ respectively with high level to produce a low level signal. Thus, each of the low level signals from exclusive OR-gate 197 and AND-gate 196 is produced from OR-gate 199 as a second correction signal $z_2$ with a low level.

If the time difference $|T_{M-1}-T_M|$ of binary coded signal $w_a$ is larger than the time difference $|T_1-T_M|$ of binary coded signal $v_a$, counting down operation of counter 193 is completed prior to that of counter 192. Upon completing the counting down operation, the counter 193 produces a low level signal to produce a low level signal from AND-gate 195. Then, the second correction signal $z_2$ from OR-gate 199 rises to a high level under control of the exclusive OR-gate 197 responsive to the low level signal from AND-gate 195. When the distribution circuit 200 receives the correction signals $z_1$ and $z_2$ respectively with low and high levels from correction signal generator 190, it cooperates with the transistors $TR_8$, $TR_9$ and $TR_{10}$ of drive circuit 220 in relation to the high level of sign signal $w_1$ so that the reversible motor 20 is rotated to operate the rack-and-pinion 22 so as to decrease the actual throttle opening angle.

Upon completing the counting down operation, the down counter 192 produces a low level signal at its carry-out terminal CO, and the correction signal $z_2$ of high level drops to a low level under condrol of the exclusive OR-gate 197 responsive to the low level signal from counter 192. Thus, the distribution circuit 200 cooperates with the transistors $TR_8$, $TR_9$ and $TR_{10}$ in response to the correction signal $z_2$ of low level so that the rotation of reversible motor 20 is stopped to cease the decrease of the throttle opening angle.

If the time difference $|T_{M-1}-T_M|$ of binary coded signal $w_a$ is smaller than the time difference $|T_1-T_M|$ of binary coded signal $v_a$, counting down operation of counter 192 is completed prior to that of counter 193. Upon completing the counting down operation, the counter 192 produces a low level signal to make the first correction signal $z_1$ from NOR-gate 198 a high level signal. The exclusive OR-gate 197 also produces a high level signal in response to the low level signal from counter 192 to make the second correction signal $z_2$ from OR-gate 199 a high level signal. When the distribution circuit 200 receives the correction signals $z_1$ and $z_2$ respectively with high level from correction signal generator 190, it cooperates with the transistors $TR_5$, $TR_6$ and $TR_7$ of drive circuit 220 in relation to the high level of sign signal $w_1$ so that the reversible motor 20 is rotated to increase the actual throttle opening angle.

Upon completion of the counting down operation, the down counter 193 produces a low level signal at its carry-out terminal CO, and the correction signal $z_2$ of high level drops to a low level under each control of the exclusive OR-gate 197 and AND-gate 195 responsive to the low level signal from counter 193. Thus, the distribution circuit 200 cooperates with the transistors $TR_5$, $TR_6$ and $TR_7$ in response to the correction signal $z_2$ of low level so that the rotation of reversible motor 20 is stopped to cease the increase of the throttle opening angle.

From the above description, it will be understood that during appearance of the operation signal $m_b$, the throttle opening angle is also decreased or increased due to a width of the correction signal $z_2$ defined by a difference between each value of binary coded signals $v_a$ and $w_a$, thereby to effectively control the actual vehicle speed toward the command value.

Although in the above operation, decrease of the vehicle speed caused by increase of the vehicle loads is controlled by the speed control apparatus of the present invention, it will be clearly understood that increase of the vehicle speed caused by decrease of the vehicle loads will be also effectively controlled by the speed control apparatus in the substantially same as the above-mentioned operation.

In case closure of set switch 40 is conducted upon reach of the actual vehicle speed to a higher value of 58.9 km/h or more and under 88.3 km/h in the above operational mode, the shift command signals $s_1$, $s_2$ and $s_3$ from cancellation circuit 150 appear respectively as a high level signal in sequence so that the shift control signals $t_1$ and $t_2$ from shift control circuit 210 appear as low and high level signals respectively, as previously described.

When binary signals from all the output terminals of latch circuits 176 to 178 of calculation circuit 170 appear as a difference signal v, the binary signals from the output terminal $Q_4$ of latch circuit 176, the output terminals $Q_1$ to $Q_4$ of latch circuit 177 and the output terminals $Q_1$ to $Q_3$ of latch circuit 178 are selected by the output shifter 230 in response to the shift control signals $t_1$ and $t_2$ respectively with low and high levels and applied to the correction signal generator 190 as a binary coded signal $v_a$, as previously described. When binary signals from all the output terminals of latch circuits 186a, 186b appear as a difference signal $w$, the binary signals from the output terminal $Q_4$ of latch circuit 186a and the output terminals $Q_1$ to $Q_3$ of latch circuit 186b are selected by the output shifter 240 in response to the shift control signals $t_1$ and $t_2$ respectively with low and high levels and applied to the correction signal generator 190 as a binary coded signal $w_a$, as previously described. Then, the correction signal generator 190 calculates each value of the binary coded signals $v_a$ and $w_a$ under control of the signal generators 130, 140 and calculation circuits 170, 180 such that the drive circuit 220 cooperates with the distribution circuit 200 to control the throttle actuator AC so as to maintain the actual vehicle speed in the higher value, as previously described.

From this description, it will be understood that the binary signals forming the binary coded signals $v_a$ and $w_a$ are different by one bit from those of the binary coded signals $v_a$ and $w_a$ obtained in the above-noted operational mode respectively, thereby to ensure precise control of the actual vehicle speed even if calculation of each of calculation circuits 170, 180 lowers in precision due to shortening of a time period caused by the desired higher speed.

In case an operator of the vehicle wishes to increase the command speed up to a higher value of 88.3 km/h or more and under 117.7 km/h, the acceleration switch 60 is manually closed to produce an electric signal which is reshaped by the wave shaper 146a of control signal generator 140 and is then inverted by the inverter 146b into an acceleration signal $n$ (see FIG. 4). When the acceleration signal n from inverter 146b is applied to the distribution circuit 200, it passes through OR-gate 208a and AND-gate 209a as a second distribution signal $K_2$ to make the transistors $TR_5$, $TR_6$ and $TR_7$ of drive circuit 220 conductive. Thus, the reversible motor 20 is rotated due to the conduction of transistors $TR_5$, $TR_6$ and $TR_7$ to increase the actual throttle opening angle, as previously described. When the vehicle speed reaches the higher desired value, the acceleration switch 60 is released to cease generation of the acceleration signal n from control signal generator 140, and the control signal generator 140 acts to produce another command-speed set signal $j_1$ in the same as generation of the above-noted command-speed set signal $j$. At this stage, the shift command signals $s_1$ and $s_2$ from cancellation circuit 150 appear simultaneously as a high level signal respectively, and the shift command signal $s_3$ from cancellation circuit 150 appears as a low level signal, as previously described. This means that the shift control signals $t_1$ and $t_2$ from shift control circuit 210 appear as high and low level signals respectively, as previously described.

When binary signals from all the output terminals of latch circuits 176 to 178 of calculation circuit 170 appear as a difference signal $v$, the binary signals from the output terminals $Q_3$, $Q_4$ of latch circuit 176, the output terminals $Q_1$ to $Q_4$ of latch circuit 177 and the output terminals $Q_1$, $Q_2$ of latch circuit 178 are selected by the output shifter 230 in response to the shift control signals $t_1$ and $t_2$ respectively with high and low levels and applied to the correction signal generator 190 as a binary coded signal $v_a$, as previously described. When binary signals from all the output terminals of latch circuits 186a, 186b appear as a difference signal $w$, the binary signals from the output terminals $Q_3$, $Q_4$ of latch circuit 186a and the output terminals $Q_1$, $Q_2$ of latch circuit 186b are selected by the output shifter 240 in response to the shift control signals $t_1$ and $t_2$ respectively with high and low levels and applied to the correction signal generator 190 as a binary coded signal $w_a$, as previously described. Then, the correction signal generator 190 calculates each value of the binary coded signals $v_a$ and $w_a$ under control of the signal generators 130, 140 and calculation circuits 170, 180 such that the drive circuit 220 cooperates with the distribution circuit 200 to control the throttle actuator AC so as to maintain the actual vehicle speed in the desired higher command value, as previously described.

From this description, it will be understood that the binary signals forming the binary coded signals $v_a$ and $w_a$ are different by two bits from those of the binary coded signals $v_a$ and $w_a$ obtained in the above-noted operational mode respectively, thereby to ensure precise control of the actual vehicle speed even if calculation of each of calculation circuits 170, 180 lowers further in precision due to further shortening of a time period caused by increase of the desired higher speed.

In case closure of acceleration switch 60 is conducted at a desired higher value of 117.7 km/h or more, the shift command signals $s_1$, $s_2$ and $s_3$ from cancellation circuit 150 appear as a low level signal respectively so that each of the shift control signals $t_1$ and $t_2$ from shift control circuit 210 appears as a low level signal, as previously described.

When binary signals from all the output terminals of latch circuits 176 to 178 of calculation circuit 170 appear as a difference signal $v$, the binary signals from the output terminals $Q_2$ to $Q_4$ of latch circuit 176, the output terminals $Q_1$ to $Q_4$ of latch circuit 177 and the output terminal $Q_1$ of latch circuit 178 are selected by the output shifter 230 in response to the shift control signals $t_1$ and $t_2$ respectively with low level and applied to the correction signal generator 190 as a binary coded signal $v_a$, as previously described. When binary signals from all the output terminals of latch circuits 186a, 186b appear as a difference signal $w$, the binary signals from the output terminals $Q_2$ to $Q_4$ of latch circuit 186a and the output terminal $Q_1$ of latch circuit 186b are selected by the output shifter 240 in response to the shift control signals $t_1$ and $t_2$ respectively with low level and applied to the correction signal generator 190 as a binary coded signal $w_a$, as previously described. Then, the correction signal generator 190 calculates each value of the binary coded signals $v_a$ and $w_a$ under control of the signal generators 130, 140 and calculation circuits 170, 180 such that the drive circuit 220 cooperates with the distribution circuit 200 to control the throttle actuator AC so as to maintain the actual vehicle speed in the desired higher command value, as previously described.

From this description, it will be understood that the binary signals forming the binary coded signals $v_a$ and $w_a$ are different by three bits from those of the binary coded signals $v_a$ and $w_a$ obtained in the above-noted operational mode respectively, thereby to ensure precise control of the actual vehicle speed even if calculation of each of calculation circuits 170, 180 lowers further in precision due to further shortening of a time period caused by increase of the desired higher speed.

When the cancel switch 50 is manually closed to produce a release signal h, the first transistor circuit 221 of drive circuit 220 is deactivated, and simultaneously the operation signal $m_a$ from RS-flip flop 149 of control signal generator 140 disappears to deactivate the second and third transistor circuits 222, 223 of drive circuit 220 under control of distribution circuit 200, as previously described. This acts to deenergize the clutch mechanism 21 and reversible motor 20, and activation of the first transistor circuit 221 is again conducted upon disappearance of the release signal h from cancel switch 50. When an operation signal $m_a$ appears from RS-flip flop 149 again upon closure of the resume switch 70, the distribution circuit 200 is permitted to activate the second and third transistor circuits 222, 223 to control the throttle actuator AC, as previously described. In case the actual vehicle speed exceeds the maximum value controllable by the speed control apparatus, a release signal $r_2$ is produced from the cancellation circuit 150 as a high level signal to deactivate the drive circuit 220 in the same operation as that of the cancel switch 50.

For practice of the present invention, the electric reversible motor 20 of throttle actuator AC may be replaced with various sources of power such as an oil-hydraulic motor, a pneumatic motor and the like. In this case, the rack-and-pinion 22 may be also replaced with a cam-mechanism.

Although in the above embodiment the speed sensor 30 having the reed switch 32 is adapted as means for detecting a vehicle speed, it may be replaced with a sensor in the form of an AC generator or a photocoupler having a photo transistor and a light emission diode. Furthermore, the command-speed set circuit 160 may be replaced with an electronic circuit in which a binary signal indicative of a period of time corresponding to a desired vehicle speed is produced by manipulation of a digital code switch independently of the clock circuit 110, timing signal generator 130 and control signal generator 140.

While in the above embodiment the present invention is adapted to the throttle valve 12 of internal combustion engine 10, it may be also adapted to a diesel engine in which the quantity of fuel supplied from a fuel source into the combustion chamber of the diesel engine is controlled by the throttle actuator AC under control of the control circuit EC.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control apparatus for an automotive vehicle driven by an internal combustion engine under control of control means for controlling the quantity of fuel supplied into said engine, the control apparatus comprising:

first means for repetitively producing a timing signal with a period of time responsive to the actual speed of the vehicle;

second means for producing a command signal indicative of a predetermined period of time defined by a desired speed of the vehicle;

third means responsive to the timing signal for calculating a first time difference between the predetermined period of time and the actual period of time of the timing signal and for producing a first difference binary coded signal indicative of an absolute value of the calculated first time difference and a first sign signal indicative of one of positive and negative signs of the calculated first time difference;

fourth means responsive to the timing signal for calculating a second time difference between the respective actual periods of time of the preceding and following timing signals and for producing a second difference binary coded signal indicative of an absolute value of the calculated second time difference and a second sign signal indicative of one of positive and negative signs of the calculated second time difference;

fifth means responsive to the timing signal for generating a first shift control signal when the actual period of time of the timing signal represents a value in a predetermined low speed range and for generating a second shift control signal when the actual period of time of the timing signal represents a value in a predetermined high speed range;

sixth means responsive to the first shift control signal for detecting the absolute value of the first difference binary coded signal in its low resolving power related to the predetermined low speed range and for producing a first detected signal indicative of the detected absolute value, said sixth means being responsive to the second shift control signal for detecting the absolute value of the first difference binary coded signal in its high resolution related to the predetermined high speed range and for producing a second detected signal indicative of the detected absolute value;

seventh means responsive to the first shift control signal for detecting the absolute value of the second difference binary coded signal in its low resolving power related to the predetermined low speed range and for producing a third detected signal indicative of the detected absolute value, said seventh means being responsive to the second shift control signal for detecting the absolute value of the second difference binary coded signal in its high resolving power related to the predetermined high speed range and for producing a fourth detected signal indicative of the detected absolute value;

eighth means responsive to the timing signal for calculating either one of the sum of values of the first and third detected signals or the sum of values of the second and fourth detected signals when respective signs of the first and second sign signals are identical to each other and for calculating either one of the difference between values of the first and third detected signals or the difference between values of the second and fourth detected signals when respective signs of the first and second sign signals are opposite to each other, said eighth means selectively producing first and second correction signals respectively indicative of the calculated sum and the calculated difference;

ninth means responsive to the timing signal and one of the first and second correction signals for selectively producing first and second output signals respectively in relation to the positive and negative signs of the second sign signal; and actuator means for actuating said control means respectively in response to the first and second output signals to increase and decrease the quantity of fuel supplied into said engine.

2. A speed control apparatus as claimed in claim 1, wherein said fifth means includes a shift command signal generator responsive to the timing signal for generating a first group of shift command signals when the actual period of time of the timing signal represents a value in a predetermined low speed range and generating a second group of shift command signals when the actual period of time of the timing signal represents a value in a predetermined high speed range; and a shift control circuit responsive to the timing signal for generating a first shift control signal upon receipt of the first group of shift command signals and generating a second shift control signal upon receipt of the second group of shift command signals.

3. A speed control apparatus as claimed in claim 2, wherein said shift control circuit includes a logic circuit responsive to the timing signal for generating a first group of binary signals upon receipt of the first group of shift command signals and for generating a second group of binary signals upon receipt of the second group of shift command signals; and an encoder responsive to the first group of binary signals for generating a first shift control signal and responsive to the second group of binary signals for generating a second shift control signal.

4. A speed control apparatus as claimed in claim 1 or 2, wherein said sixth means is an analog multiplexer circuit responsive to the first shift control signal for detecting the absolute value of the first difference binary coded signal in its high-order binary digits related to the predetermined low speed range and for producing a first detected signal indicative of the detected high-order binary digits, said analog multiplexer circuit being responsive to the second shift control signal for detecting the absolute value of the first difference binary coded signal in its low-order binary digits related to the predetermined high speed range and for producing a second detected signal indicative of the detected low-order binary digits; and wherein said seventh means is an analog multiplexer circuit responsive to the first shift control signal for detecting the absolute value of the second difference binary coded signal in its high-order binary digits related to the predetermined low speed range and for producing a third detected signal indicative of the detected high-order binary digits, said second-named analog multiplexer circuit being responsive to the second shift control signal for detecting the absolute value of the second difference binary coded signal in its low-order binary digits related to the predetermined high speed range and for producing a fourth detected signal indicative of the detected low-order binary digits.

5. A speed control apparatus as claimed in claim 1, further comprising:

tenth means arranged to be activated by setting said control apparatus when the actual speed of the vehicle reaches the desired value, said tenth means producing a set signal upon activation thereof; and eleventh means responsive to the set signal for producing an operation signal upon receiving the timing signal and for ceasing generation of the operation signal in response to one of the subsequent timing signals from said first means; and wherein said eighth means is responsive to the timing signal during generation of the operation signal for producing a correction signal indicative of one of values of the third and fourth detected signals, each calculation in said eighth means being conducted in response to the timing signal after disappearance of the operation signal, and selective generation of the first and second output signals from said ninth means is further conducted in response to the timing signal and the correction signal in relation to the positive or negative sign of the second sign signal.

* * * * *